United States Patent
Clough et al.

(10) Patent No.: US 10,889,687 B2
(45) Date of Patent: *Jan. 12, 2021

(54) POLYMERIZABLE COMPOSITIONS, POLYMERIZED COMPOSITIONS, AND METHODS OF MAKING AND USING THE SAME

(71) Applicant: 3M INNOVATIVE PROPERTIES COMPANY, St. Paul, MN (US)

(72) Inventors: Robert S. Clough, St. Paul, MN (US); Susan E. DeMoss, Stillwater, MN (US); Michael A. Kropp, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 110 days.

This patent is subject to a terminal disclaimer.

(21) Appl. No.: 15/756,283

(22) PCT Filed: Sep. 9, 2016

(86) PCT No.: PCT/US2016/050895
§ 371 (c)(1),
(2) Date: Feb. 28, 2018

(87) PCT Pub. No.: WO2017/044704
PCT Pub. Date: Mar. 16, 2017

(65) Prior Publication Data
US 2018/0237590 A1 Aug. 23, 2018

Related U.S. Application Data

(60) Provisional application No. 62/216,711, filed on Sep. 10, 2015.

(51) Int. Cl.
*C08G 75/12* (2016.01)
*C08G 75/045* (2016.01)

(52) U.S. Cl.
CPC ........... *C08G 75/12* (2013.01); *C08G 75/045* (2013.01)

(58) Field of Classification Search
CPC .... C07F 5/02; C09J 4/00; C08L 33/08; C08L 33/10; C08L 57/00
See application file for complete search history.

(56) References Cited

U.S. PATENT DOCUMENTS

| | | | |
|---|---|---|---|
| 3,275,611 A * | 9/1966 | Fields | C08F 4/32 526/197 |
| 4,538,920 A | 9/1985 | Drake | |
| 5,082,147 A | 1/1992 | Jacobs | |
| 5,310,835 A | 5/1994 | Skoultchi et al. | |
| 5,616,796 A | 4/1997 | Pocius | |
| 5,621,143 A | 4/1997 | Pocius | |
| 5,795,657 A | 8/1998 | Pocius | |
| 6,252,023 B1 | 6/2001 | Moren | |
| 6,410,667 B1 | 6/2002 | Moren | |
| 6,486,090 B1 | 11/2002 | Moren | |
| 6,605,687 B1 | 8/2003 | Gross | |
| 6,849,569 B2 | 2/2005 | Moren | |
| 10,513,583 B2 * | 12/2019 | Clough | C08G 75/045 |
| 2012/0094027 A1 * | 4/2012 | Cranfill | B05D 7/00 427/372.2 |
| 2016/0170107 A1 * | 6/2016 | Ryu | C09K 9/02 252/586 |
| 2017/0174839 A1 * | 6/2017 | Clough | C08F 4/54 |

FOREIGN PATENT DOCUMENTS

| | | |
|---|---|---|
| EP | 0 250 090 A2 | 12/1987 |
| JP | 63-022809 A | 1/1988 |
| JP | 2000-086670 A | 3/2000 |
| JP | 2003-252918 A | 9/2003 |
| JP | 2009-185198 A | 8/2009 |
| WO | WO 2001-32717 | 5/2001 |
| WO | WO 2005-000911 | 1/2005 |
| WO | WO 2010-149747 | 12/2010 |
| WO | WO 2012/160452 A1 | 11/2012 |

(Continued)

OTHER PUBLICATIONS

Ichinose, "Et$_3$B Induced Radical Addition of Thiols to Acetylenes", Chemistry Letters (the Chemical Society of Japan), 1987, pp. 1647-1650.

Masuda, "A Remarkably Efficient Initiation by 9-BBN in the Radical Addition Reactions of Alkanethiols to Alk-1-enes", Journal of Chemical Society, Chem. Communications, 1991, pp. 1444-1445.

International Search Report for PCT International Application No. PCT/US2016/050895, dated Dec. 15, 2016, 4pgs.

*Primary Examiner* — Gregory Listvoyb

(74) *Attorney, Agent, or Firm* — Bradford B. Wright

(57) ABSTRACT

A polymerizable composition includes an organoborane-base complex that is a complex of an organoborane and a base, a decomplexing agent that at least partially liberates the organoborane from the organoborane-base complex, a polymerizable thiol-containing component comprising at least one polymerizable thiol-containing compound having a plurality of thiol groups in which the sulfur atom of the thiol group is covalently bonded to carbon, a hydroperoxide, and a polymerizable ethylenically-unsaturated component comprising at least one polymerizable ethylenically-unsaturated compound having a plurality of ethylenically-unsaturated groups. The combined amounts of the thiol-containing and ethylenically-unsaturated compounds total at least 50 percent by weight of all polymerizable material in the polymerizable composition. The composition may be provide as a two-part composition. Polymerized reaction product of the composition and methods of making the composition are also disclosed.

13 Claims, No Drawings

(56) References Cited

FOREIGN PATENT DOCUMENTS

| WO | WO 2015/094350 A1 | 6/2015 |
| WO | WO 2015-148319 | 10/2015 |
| WO | WO 2016-130673 | 8/2016 |

* cited by examiner

US 10,889,687 B2

POLYMERIZABLE COMPOSITIONS, POLYMERIZED COMPOSITIONS, AND METHODS OF MAKING AND USING THE SAME

BACKGROUND

There is a need for materials and chemistries that can form polymers, particularly crosslinked polymers, rapidly under ambient or mild conditions, particularly in the presence of oxygen.

SUMMARY

The present disclosure provides compositions, particularly flowable polymerizable compositions, that include a thiol-containing compound and an ethylenically-unsaturated compound that can cure (i.e., polymerize and/or crosslink) under ambient or mild conditions, particularly in the presence of oxygen (e.g., $O_2$ or a peroxygen compound) to form solids, including viscoelastic solids. The compositions can be used to form adhesives, sealants, encapsulants, and potting resins, for example. Such compositions include an organoborane-base complex, especially those containing a trialkylborane, which can be used in the presence of oxygen or a peroxygen compound to initiate the curing (i.e., polymerization and/or crosslinking).

It is discovered that hydroperoxides as peroxygen compounds are much more effective than other organic peroxides (e.g., dialkyl peroxides) in speeding the cure of the thiol-ene compositions in oxygen ($O_2$)-limited environments or where the diffusion of oxygen into the composition is restricted. Examples of such $O_2$-limited environments include thick cross-sections, in highly-filled compositions, and compositions disposed between impervious substrates. The presence of hydroperoxide greatly enhances the ability of thiol-ene compositions to uniformly cure in such environments.

In addition, it is presently discovered that formulations containing a high percentage by weight of ether, thioether, and/or disulfide groups and higher rank sulfur linkages (e.g., trisulfide and tetrasulfide) may cure slowly relative to other comparable formulations. This is the case when the structures of the thiol-containing and/or ethylenically-unsaturated compounds are predominantly oxygen or sulfur atoms separated by methylene ($-CH_2-$), ethylene ($-CH_2CH_2-$), or propylene ($-CH_2CH(CH_3)-$) units and these compounds form the majority of the formulation.

In one aspect, the present disclosure provides a polymerizable composition comprising:
an organoborane-base complex that is a complex of an organoborane and a base, wherein the base is a complexing agent selected from a compound having one or more amine groups, amidine groups, hydroxide groups, alkoxide groups, or a combination thereof;
a decomplexing agent that at least partially liberates the organoborane from the organoborane-base complex;
a polymerizable thiol-containing component comprising at least one polymerizable thiol-containing compound having a plurality of thiol groups (i.e., mercapto groups) in which the sulfur atom of the thiol group is covalently bonded to carbon (i.e., through C—S bonds);
a hydroperoxide; and
a polymerizable ethylenically-unsaturated component comprising at least one polymerizable ethylenically-unsaturated compound having a plurality of ethylenically-unsaturated groups;
wherein the combined amounts of the thiol-containing and ethylenically-unsaturated compounds total at least 50 percent by weight of all polymerizable material in the polymerizable composition.

In certain embodiments, upon reaction (i.e., curing which involves polymerizing and/or crosslinking) a —C—S—C—C— linkage (e.g., a —$CH_2$—S—$CH_2$—$CH_2$— or —CHZ—S—$CH_2$—$CH_2$— linkage where Z is an organic group) is formed.

In another aspect, the present disclosure provides a polymerizable composition comprising:
a part A composition comprising a organoborane-base complex that is a complex of an organoborane and a base, wherein the base is a complexing agent selected from a compound having one or more amine groups, amidine groups, hydroxide groups, alkoxide groups, or a combination thereof; and
a part B composition comprising a decomplexing agent that at least partially liberates the organoborane from the organoborane-base complex;
wherein the polymerizable composition further comprises:
a polymerizable thiol-containing component comprising at least one polymerizable thiol-containing compound having a plurality of thiol groups in which the sulfur atom of the thiol group is covalently bonded to carbon;
a hydroperoxide; and
a polymerizable ethylenically-unsaturated component comprising at least one polymerizable ethylenically-unsaturated compound having a plurality of ethylenically-unsaturated groups,
wherein the combined amounts of the thiol-containing and ethylenically-unsaturated compounds total at least 50 percent by weight of all polymerizable material in the polymerizable composition.

In certain embodiments, upon reaction a —C—S—C—C— linkage is formed.

In yet another aspect, the present disclosure provides a composition prepared by combining components comprising:
a part A composition comprising a organoborane-base complex that is a complex of an organoborane and a base, wherein the base is a complexing agent selected from a compound having one or more amine groups, one or more amidine groups, one or more hydroxide groups, one or more alkoxide groups, or a combination thereof; and
a part B composition comprising a decomplexing agent that at least partially liberates the organoborane from the organoborane-base complex,
wherein at least one of the part A composition and the part B composition further comprises:
a polymerizable thiol-containing component comprising at least one polymerizable thiol-containing compound having a plurality of thiol groups in which the sulfur atom of the thiol group is covalently bonded to carbon;
a hydroperoxide; and
a polymerizable ethylenically-unsaturated component comprising at least one polymerizable ethylenically-unsaturated compound having a plurality of ethylenically-unsaturated groups,
wherein the combined amounts of the thiol-containing and ethylenically-unsaturated compounds total at least 50 percent by weight of all polymerizable material in the polymerizable composition.

In certain embodiments, upon reaction a —C—S—C—C— linkage is formed.

The present disclosure further provides a method of making a composition that includes combining components that include: a part A composition including an organoborane-base complex, wherein the base is a complexing agent selected from a compound having one or more amine groups, amidine groups, hydroxide groups, alkoxide groups, or a combination thereof; and a part B composition including a decomplexing agent that at least partially liberates the organoborane from the organoborane-base complex; and allowing the part A and part B to react (preferably, to form a polymer that includes a —C—S—C—C— linkage (e.g., a —CH$_2$—S—CH$_2$—CH$_2$— or —CHZ—S—CH$_2$—CH$_2$— linkage where Z is an organic group)).

Accordingly, in yet another aspect, the present disclosure provides a method of making a composition, the method comprising:

combining components comprising:

a part A composition comprising a organoborane-base complex that is a complex of an organoborane and a base, and wherein the base is a complexing agent selected from a compound having one or more amine groups, amidine groups, hydroxide groups, alkoxide groups, or a combination thereof; and a part B composition comprising a decomplexing agent that at least partially liberates the organoborane from the organoborane-base complex;

wherein at least one of the part A composition and the part B composition further comprises:

a polymerizable thiol-containing component comprising at least one polymerizable thiol-containing compound having a plurality of thiol groups in which the sulfur atom of the thiol group is covalently bonded to carbon;

a hydroperoxide; and a polymerizable ethylenically-unsaturated component comprising at least one polymerizable ethylenically-unsaturated compound having a plurality of ethylenically-unsaturated groups, wherein the combined amounts of the thiol-containing and ethylenically-unsaturated compounds total at least 50 percent by weight of all polymerizable material in the composition; and allowing the part A composition and the part B composition to react to form a polymer.

As used herein, the term "organic group" means a hydrocarbon group (with optional elements other than carbon and hydrogen, including oxygen, nitrogen, sulfur, phosphorus, halogen, and/or silicon). In some embodiments, the organic group does not include silicon. The organic group can be monovalent, divalent, trivalent, or any other desired valency. Example organic groups include an aliphatic group, cyclic group, or combination of aliphatic and cyclic groups (e.g., alkaryl and aralkyl groups). The term "aliphatic group" means a saturated or unsaturated linear or branched hydrocarbon group. This term is used to encompass monovalent groups such as alkyl, alkenyl, and alkynyl groups, for example, as well as corresponding groups with higher valencies. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated, linear or branched hydrocarbon group other than an aromatic group with one or more carbon-carbon double bonds, such as a vinyl group. The term "alkynyl group" means an unsaturated, linear or branched hydrocarbon group with one or more carbon-carbon triple bonds, such as an ethynyl group. The term "cyclic group" means a closed ring hydrocarbon group that is classified as a cycloaliphatic (i.e., alicyclic) group, aromatic group, or heterocyclic (e.g., oxygen-, nitrogen-, or sulfur-containing) group. The term "cycloaliphatic group" means a cyclic hydrocarbon group having properties resembling those of aliphatic groups. Cycloaliphatic groups include monovalent groups such as cycloalkyl groups (i.e., cyclic alkyl groups such as cyclopropyl, and cyclobutyl, for example, as well as corresponding groups with higher valencies). The term "aromatic group" or "aryl group" means a mono- or polynuclear aromatic hydrocarbon group. The term "heterocyclic group" means a closed ring hydrocarbon in which one or more of the atoms in the ring is an element other than carbon (e.g., nitrogen, oxygen, and/or sulfur). Any of these groups may be substituted or unsubstituted. If substituted, the substituents may include halogen, hydroxy, alkoxy, alkylamino, alkyl, nitro, and the like. A group that may be the same or different is referred to as being "independently" something.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one."

The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain situations by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Also, as used herein in connection with a measured quantity, the term "approximately" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, and 5).

When a group is present more than once in a formula described herein, each group is "independently" selected, whether specifically stated or not. For example, when more than one R group is present in a formula, each R group is independently selected. Furthermore, subgroups contained within these groups are also independently selected.

As used herein, the term "room temperature" refers to a temperature of 19° C. to 25° C., or more often to a temperature of 21° C.

As used herein, the term "thiol group" refers to an —SH group (i.e., a mercapto group).

Features and advantages of the present disclosure will be further understood upon consideration of the detailed description as well as the appended claims.

DETAILED DESCRIPTION

Compositions of the present disclosure include an organoborane-base complex, especially those containing a trialkylborane, a decomplexing agent, and a hydroperoxide that can initiate the curing (polymerizing and/or crosslinking) of a polymerizable composition to form solids, including viscoelastic solids.

In particular, the present disclosure provides a polymerizable composition that includes: an organoborane-base complex, wherein the base is a complexing agent selected from a compound having one or more amine groups, amidine groups, hydroxide groups, alkoxide groups, or a combination thereof; a decomplexing agent that at least partially liberates the organoborane from the organoborane-base complex; a hydroperoxide; at least one polymerizable thiol-containing compound having a plurality of thiol groups (i.e., mercapto groups) in which the sulfur atom of the thiol group is covalently bonded to carbon; and at least one polymerizable ethylenically-unsaturated compound having a plurality of ethylenically-unsaturated groups. The thiol-containing and the ethylenically-unsaturated compounds may be polydiorganosiloxanes, for example.

The curing reaction involves thiol-ene chemistry or the addition of a thiol group across carbon-carbon unsaturation, where the sulfur and hydrogen that add across an individual site of carbon-carbon unsaturation are not necessarily from the same thiol group, and the hydrogen may be from other compounds in addition to those that contain thiol groups. An organoborane-base complex, especially a trialkylborane-base complex, is used to initiate polymerizing and/or crosslinking reactions.

An organoborane, especially a trialkylborane, in the presence of oxygen or a peroxygen compound is used to initiate polymerizing and/or crosslinking reactions. The decomplexing agent reacts with the base to liberate the organoborane from the organoborane-base complex. In the presence of oxygen, the trialkylborane reacts with oxygen and subsequently fragments to generate free radical species some of which initiate the addition reaction of a thiol with an ethylenically-unsaturated group. The compounds of the present invention undergo the reaction and afford polymeric materials, which are typically crosslinked polymeric materials. The polymers formed can be hydrocarbon-based or silicone-based. In certain embodiments, the polymers formed upon reaction include a —C—S—C—C— linkage (e.g., a —$CH_2$—S—$CH_2$—$CH_2$— or —CHZ—S—$CH_2$—$CH_2$— linkage where Z is an organic group).

In certain situations or applications, particularly those where $O_2$ may be limited or diffusion of $O_2$ into the composition may be restricted, such as thick cross-sections, highly filled compositions, and between impervious substrates, a peroxygen compound may be needed to increase the rate of cure, or to increase the degree of cure in a certain amount of time. Also, compositions containing a high percentage by weight of ether, thioether, and/or disulfide groups and higher rank sulfur linkages (e.g., trisulfide and tetrasulfide) may cure slowly, and a peroxygen compound may be needed to increase the rate of cure, or to increase the degree of cure in a certain amount of time. This is the case when the structures of the thiol-containing and/or ethylenically-unsaturated compounds are predominantly oxygen or sulfur atoms separated by methylene (—$CH_2$—), ethylene (—$CH_2CH_2$—), or propylene (—$CH_2CH(CH_3)$—) units and these compounds form the majority of the composition. In certain embodiments, the combined amount of oxygen and sulfur atoms in aliphatic ether, aliphatic thioether, and aliphatic disulfide groups and higher rank sulfur linkages in the thiol-containing compounds and ethylenically-unsaturated compounds of the composition is at least 15 weight percent, at least 20 weight percent, at least 25 weight percent, or at least 30 weight percent based on the total weight of the thiol-containing compounds and ethylenically-unsaturated compounds in the composition. Hydroperoxides are particularly effective in providing rapid cures or short cure times in these situations or applications. It should be noted that the hydroperoxides are not being utilized as conventional thermal free radical initiators that undergo thermolysis to generate free radical species, which initiate the thiol-ene reaction. For example, preferred hydroperoxides are organic hydroperoxides. Preferred organic hydroperoxides include, e.g., tertiary organic hydroperoxides (i.e., where the hydroperoxy group (—OOH) is bound to a tertiary carbon atom), such as tert-butyl hydroperoxide. These hydroperoxides typically must be heated to over 125° C. in order to reduce the original amount of the hydroperoxide by 50 percent in 10 hours. Thus, their thermolysis is not suitable for rapid cures at ambient conditions, i.e., room temperature. Without wishing to be bound by any particular reaction pathway, it appears that the hydroperoxide may react or interact with the organoborane-base complex and/or its freed components to accelerate the generation of free radical species that initiate the thiol-ene reaction or polymerization.

In certain embodiments, the total amount of the thiol-containing and ethylenically-unsaturated compounds total at least 50 percent by weight of all polymerizable material in the composition. In certain embodiments, the amount of the thiol groups and the amount of ethylenically-unsaturated groups are present in a molar ratio range of 0.25:1.0 to 4.0:1.0, or 0.33:1.0 to 3.0:1.0, or 0.5:1.0 to 2.0:1.0, or 0.75:1.0 to 1.33:1.0, or 0.80:1.0 to 1.25:1.0 (thiol groups: ethylenically-unsaturated groups). In certain embodiments, for example where crosslinking of high molecular weight polymers that contain an ethylenically-unsaturated repeating unit, such as 1,2-polybutadiene or unsaturated polyesters, is desired, the amount of thiol groups and the amount of ethylenically-unsaturated groups may be present in a molar range of 0.005:1.0 to 0.20:1.0 (thiol groups:ethylenically-unsaturated groups).

The compositions of the present disclosure typically include at least two parts (i.e., they are multi-part polymerizable compositions), and preferably, two parts. The at least two-part compositions according to the present disclosure include a part A and a part B. Individually, parts A and B have good stability, but when combined stability is lost and curing is initiated.

The part A composition includes an organoborane-base complex. The part B includes a decomplexing agent for the organoborane-base complex. The polymerizable composition (i.e., the part A composition and/or the part B composition and/or other parts) further includes: a thiol-containing component that includes at least one polymerizable thiol-containing compound having a plurality of thiol groups in which the sulfur atom of the thiol group is covalently bonded to carbon; an ethylenically-unsaturated component that includes at least one polymerizable ethylenically-unsaturated compound having a plurality of ethylenically-unsaturated groups; and a hydroperoxide. That is, the thiol-containing component is in part A, part B, and/or another part distinct from parts A and B; the ethylenically-unsaturated component is in part A, part B, and/or another part distinct from parts A and B, and the hydroperoxide is in part A, part B, and/or another part distinct from parts A and B. In certain embodiments, the thiol-containing compound and the ethylenically-unsaturated compound are separate and distinct compounds. In certain embodiments, one compound may have both thiol groups and ethylenically-unsaturated groups.

Organoborane-Base Complex

The organoborane-base complex is a latent form of an organoborane which is liberated upon decomplexing the base with a compound that reacts with the base, such as, for example, an acid. The free organoborane is an initiator capable of initiating free-radical polymerization of polymerizable monomer(s) to form a polymer that can be useful as an adhesive, sealant, encapsulant, and potting resin, for example.

The organoborane portion of the organoborane-base complex is of the following formula (Formula I):

$B(R^1)(R^2)(R^3)$                 (I)

wherein $R^1$, $R^2$, and $R^3$ are organic groups (typically having 30 atoms or less, or 20 atoms or less, or 10 atoms or less). In certain embodiments of Formula I, $R^1$ represents an alkyl group having from 1 to 10 carbon atoms, or from 1 to 6 carbon atoms, or from 1 to 5 carbon atoms, or from 1 to 4 carbon atoms, or from 2 to 4 carbon atoms, or from 3 to 4 carbon atoms.

In certain embodiments of Formula I, $R^2$ and $R^3$ independently represent (i.e., they may be the same or different): alkyl groups having 1 to 10 carbon atoms (or from 1 to 6 carbon atoms, or from 1 to 5 carbon atoms, or from 1 to 4 carbon atoms, or from 2 to 4 carbon atoms, or from 3 to 4 carbon atoms); cycloalkyl groups having 3 to 10 carbon atoms; aryl groups having from 6 to 12 carbon atoms (e.g., phenyl); or aryl groups having from 6 to 12 carbon atoms (e.g., phenyl) substituted with alkyl groups having 1 to 10 carbon atoms (or from 1 to 6 carbon atoms, or from 1 to 5 carbon atoms, or from 1 to 4 carbon atoms, or from 2 to 4 carbon atoms, or from 3 to 4 carbon atoms), or cycloalkyl groups having 3 to 10 carbon atoms. Any two of $R^1$, $R^2$, and $R^3$ groups may optionally be part of a ring (e.g., two groups can combine to form a ring).

The organoborane initiator is complexed with a basic complexing agent (i.e., a base that complexes with the organoborane) to form a stable organoborane-base complex. The organoborane-base complex may be represented by the formula (Formula II):

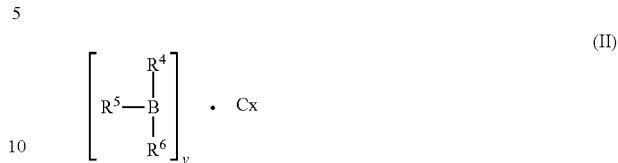

wherein Cx represents a complexing agent selected from a compound having one or more amine groups, one or more amidine groups, one or more hydroxide groups, one or more alkoxide groups, or a combination thereof; and v is a positive number. The value of v is selected so as to render the organoborane-base complex stable under ambient conditions. For example, when the organoborane-base complex is stored in a capped vessel at about 20° C. to 22° C. and under otherwise ambient conditions (i.e., the vessel is capped in an ambient air environment and not under vacuum or an inert atmosphere), the complex remains useful as an initiator for at least two weeks. Preferably, the complexes may be readily stored under these conditions for many months, and up to a year or more. In certain embodiments the value of v is typically at least 0.1, or at least 0.3, or at least 0.5, or at least 0.8, or at least 0.9 and is often up to 4, or up to 3, or up to 2, or up to 1.5, or up to 1.2. In some embodiments, v is in a range of 0.1 to 4, or in a range of 0.5 to 2, or in a range of 0.8 to 1.2, or in a range of 0.9 to 1.1, or 1.

In certain embodiments of Formula II, $R^4$ represents an alkyl group having from 1 to 10 carbon atoms, or from 1 to 6 carbon atoms, or from 1 to 5 carbon atoms, or from 1 to 4 carbon atoms, or from 2 to 4 carbon atoms, or from 3 to 4 carbon atoms.

In certain embodiments of Formula II, $R^5$ and $R^6$, independently represent (i.e., they may be the same or different): alkyl groups having 1 to 10 carbon atoms (or from 1 to 6 carbon atoms, or from 1 to 5 carbon atoms, or from 1 to 4 carbon atoms, or from 2 to 4 carbon atoms, or from 3 to 4 carbon atoms); cycloalkyl groups having 3 to 10 carbon atoms; aryl groups having from 6 to 12 carbon atoms (e.g., phenyl); or aryl groups having from 6 to 12 carbon atoms (e.g., phenyl) substituted with alkyl groups having 1 to 10 carbon atoms (or from 1 to 6 carbon atoms, or from 1 to 5 carbon atoms, or from 1 to 4 carbon atoms, or from 2 to 4 carbon atoms, or from 3 to 4 carbon atoms), or cycloalkyl groups having 3 to 10 carbon atoms. Any two of $R^4$, $R^5$, and $R^6$ groups may optionally be part of a ring (e.g., two groups can combine to form a ring).

Herein, in Formulas I and II, an alkyl group may be straight chain or branched.

In certain embodiments, a ring formed by two groups of $R^1$, $R^2$, and $R^3$ or formed by two groups of $R^4$, $R^5$, and $R^6$ may be bridged by the boron atom in Formula I or Formula II.

In certain embodiments of Formula II, $R^4$ represents an alkyl group having from 1 to 10 carbon atoms; $R^5$ and $R^6$ independently represent alkyl groups having 1 to 10 carbon atoms or aryl groups having 6 to 12 carbon atoms; Cx represents a complexing agent selected from a compound having one or more amine groups, amidine groups, hydroxide groups, alkoxide groups, or a combination thereof; and v is a positive number such as in a range of 0.1 to 4, in a range of 0.5 to 2, in a range of 0.8 to 1.2, or 0.9 to 1.1, or 1.

In certain embodiments, the organoborane-base complex does not include a thiol group.

Among preferred organoboranes of the organoborane-base complexes are trimethylborane, triethylborane, tri-n-propylborane, tri-isopropylborane, tri-n-butylborane, tri-isobutylborane, and tri-sec-butylborane.

Useful basic complexing agents (Cx) include, for example, amines, amidines, hydroxides, and/or alkoxides. Sufficient complexing agent is provided to ensure stability of the organoborane-base complex under ambient conditions. Insufficient complexing agent could leave free organoborane, a material that tends to be pyrophoric. In practice, to ensure stability of the complex at ambient conditions, the compound that serves as the complexing agent is often in excess, i.e., some of the compound is free or not complexed in the composition. The amount of excess basic complexing agent is chosen to ensure stability of the complex under ambient conditions while still achieving desired performance such as cure rate of the polymerizable composition and mechanical properties of the cured composition. For example, there may be up to 100 percent molar excess, or up to 50 percent molar excess, or up to 30 percent molar excess of the basic complexing agent relative to the organoborane. Often, there is 10 to 30 percent molar excess of the basic complexing agent relative to the organoborane.

Useful basic complexing agents include, for example, amine compounds, amidine compounds, hydroxides, alkoxides, or combinations thereof. The amine compounds have a primary amine group and/or a secondary amine group. The amidine compounds have an amidine group. The hydroxides and alkoxides are salts having hydroxide and alkoxide groups, respectively, such as shown in Formula VIII hereinbelow.

Amine complexing agents (Cx) may be provided by a wide variety of materials having one or more primary or secondary amine groups, including blends of different amines. Amine complexing agents may be a compound with a single amine group or may be a polyamine (i.e., a material having multiple amine (i.e., amino) groups such as two or more primary, secondary, or tertiary amine groups). Suitable polyamines have at least one amine group that is a primary and/or secondary amine group.

In one embodiment, the amine complexing agent may be a primary or secondary monoamine represented by the following formula (Formula III):

(III)

wherein: $R^7$ and $R^8$ are independently selected from the group consisting of hydrogen, and organic groups, preferably alkyl groups having 1 to 10 carbon atoms, alkylcycloalkyl groups (i.e., an alkyl substituted with an cycloalkyl or a cycloalkyl substituted with an alkyl), alkylaryl (i.e., an alkyl substituted with an aryl) groups in which the amine group is not directly attached to the aryl structure, and polyoxyalkylene groups. The organic groups may include substituents, particularly hydroxyl or alkoxy substituents. Alternatively, $R^7$ and $R^8$ together with the nitrogen atom to which they are attached may be joined to form a 4 to 7-membered heterocyclic ring. The heterocyclic ring can include additional heteroatoms such as oxygen, sulfur, or nitrogen in addition to the nitrogen atom joining $R^7$ and $R^8$. In some embodiments, the complexing agent of Formula (III) is a primary amine (i.e., one but not both of $R^7$ or $R^8$ is hydrogen). Particular examples of amines of Formula (III) include ammonia, ethylamine, butylamine, hexylamine, octylamine, benzylamine, piperidine, pyrrolidine, 3-methoxypropylamine, and polyoxyalkylene monoamines (e.g., as marketed under the trade designation JEFFAMINE by Huntsman Corp., Salt Lake City, Utah). Specific examples include JEFFAMINE M715 and JEFFAMINE M2005 polyoxyalkylene monoamines.

In another embodiment, the amine may be a polyamine such as those represented by the following formula (Formula IV):

(IV)

wherein $R^7$ and $R^8$ are as defined above and $R^9$ is a divalent organic group, preferably a divalent alkylene, cycloalkylene, alkylene-arylene-alkylene, or alkylene-heterocyclic-alkylene group. An alkylene refers to a divalent radical of an alkane and typically has 1 to 10 carbon atoms. An arylene refers to a divalent radical of an aromatic group and often has 6 to 12 carbon atoms. Examples of arylene groups include phenylene and diphenylene. The divalent organic group $R^9$ can optionally include a group of formula —$NR^a$—, an oxy group, a carbonyl group, or a combination thereof between two alkylene groups. Group $R^a$ is typically hydrogen or an alkyl group. Preferably, compounds of Formula (IV) have at least one primary amine group. Examples of these polyamines are dimethylaminopropylamine, and aminopropylmorpholine.

Still other suitable polyamines are alkanediamines, which may be branched or linear, and having the following formula (Formula V):

(V)

wherein x is a whole number greater than or equal to 1, more preferably 2 to 12, and each $R^{10}$ is independently a hydrogen or an alkyl group. Examples of alkanediamines include 1,2-ethanediamine, 1,3-propanediamine, 1,5-pentanediamine, 1,6-hexanediamine, 1,12-dodecanediamine, 2-methyl-1,5-pentanediamine, and 3-methyl-1,5-pentanediamine.

Still other amine complexing agents are various alkane-polyamines having three or more amine groups such as, for example, triethylenetetraamine or diethylenetriamine, or compounds having a heterocyclic group such as, for example, 4-(dimethylamino)pyridine.

Other useful polyamines also include polyoxyalkylenepolyamines. Suitable polyoxyalkylenepolyamines are reported, for example, in U.S. Pat. No. 5,621,143 (Pocius). Preferred polyoxyalkylenepolyamines may be represented by the following formulae (Formula VI and Formula VII):

$$H_2NR^{11}O(R^{12}O)_w(R^{13}O)_u(R^{12}O)_yR^{11}NH_2 \quad (VI)$$

(i.e., polyoxyalkylenediamines); or $$[H_2NR^{11}O(R^{12}O)_w]_zR^{14} \quad (VII)$$

wherein $R^{11}$, $R^{12}$, and $R^{13}$ represent alkylene groups (i.e., an alkylene is a divalent radical of an alkane) having 1 to 10 carbon atoms, which may be the same or may be different. In certain embodiments, $R^{11}$ is an alkylene group having 2 to 4 carbon atoms such as ethylene, n-propylene, isopropylene, n-butylene or isobutylene. In certain embodiments, $R^{12}$ and $R^{13}$ are alkylene groups having 2 or 3 carbon atoms such as ethylene, n-propylene, or isopropylene. The $R^{14}$ group is a z-valent organic group (e.g., a residue of a polyol used to prepare the polyoxyalkylenepolyamine), preferably having from 1 to 18 carbon atoms. The $R^{14}$ group may be branched or linear, and substituted or unsubstituted (although substituents should preferably not interfere with oxyalkylation reactions). The value of w is typically greater than or equal to 1, or, in certain embodiments, 1 to 50, or 1 to 20. The values of u and y are typically both greater than or equal to 0. The value of z is typically greater than or equal to 2, or, in certain embodiments, 3 or 4 (so as to provide, respectively, polyoxyalkylenetriamines and polyoxyalkylenetetraamines). It is preferred that the values of w, u, y, and z be chosen such that the resulting complex is a liquid at room temperature, as this simplifies handling and mixing thereof.

Usually, the polyoxyalkylenepolyamine is itself a liquid. For the polyoxyalkylenepolyamine, molecular weights of less than 5000 grams/mole may be used, although molecular weights of 1000 grams/mole or less are more preferred, and molecular weights of 140 to 1000 grams/mole are most preferred. Examples of polyoxyalkylenepolyamines include, but are not limited to, poly(ethylene oxide)diamine, poly(propylene oxide)diamine, poly(propylene oxide)triamine, diethylene glycol dipropylamine, triethylene glycol dipropylamine, poly(tetramethylene oxide)diamine, poly(ethylene oxide-co-propylene oxide)diamine, and poly(ethylene oxide-co-propylene oxide)triamine. Examples of suitable commercially available polyoxyalkylenepolyamines include those marketed under the trade designation JEFFAMINE by Huntsman Corporation such as the D-, ED-, and EDR-series diamines (e.g., D-400, D-2000, D-5000, ED-600, ED-900, ED-2001, and EDR-148), and the T-series triamines (e.g., T-403), as well as DCA-221 from Dixie Chemical Co., Pasadena, Tex.

As reported in U.S. Pat. No. 5,616,796 (Pocius et al.), the polyamine may also include the condensation reaction product of diprimary-amine-terminated material (i.e., the two terminal groups are primary amine groups) and one or more materials containing at least two groups that are reactive with primary amines.

In certain embodiments, the amine may be an aziridine. Aziridines are not preferred, however, because there may be stability issues with such compounds.

Suitable hydroxide and/or alkoxide complexing agents (Cx) are reported, for example, in U.S. Pat. No. 6,486,090 (Moren). Preferred hydroxide and/or alkoxide complexing agents may be represented by the formula (Formula VIII):

$$(R^{15}O^{(-)})_n M^{(m+)} \quad \quad (VIII)$$

wherein:

$R^{15}$ is independently selected from hydrogen or an organic group (e.g., alkyl group);

$M^{(m+)}$ represents a countercation with a charge m+ (e.g., sodium, potassium, tetraalkylammonium, or combinations thereof);

n is an integer greater than zero such as 1 to 6 or 1 to 4 or 1 to 3; and m is an integer greater than zero such as 1 to 6 or 1 to 4 or 1 to 3. Preferably, the variables n and m are equal.

"Amidines" are compounds having at least one N═C—N unit in its structure. Exemplary amidine complexing agents (Cx) are reported in U.S. Pat. No. 6,410,667 (Moren). Other amidine complexing agents include, for example, N,N,N', N'-tetramethylguanidine; 1,8-diazabicyclo[5.4.0]undec-7-ene; 1,5-diazabicyclo[4.3.0]non-5-ene; 2-methylimidazole; and 2-methylimidazoline.

The organoborane-base complex may be readily prepared using known techniques, as described, for example, in U.S. Pat. No. 5,616,796 (Pocius et al.), U.S. Pat. No. 5,621,143 (Pocius), U.S. Pat. No. 6,252,023 (Moren), U.S. Pat. No. 6,410,667 (Moren), and U.S. Pat. No. 6,486,090 (Moren).

Organoborane-amine complexes are available from suppliers such as BASF and AkzoNobel. TEB-DAP (triethylborane-1,3-diaminopropane (or 1,3-propanediamine) complex), TnBB-MOPA (tri-n-butylborane-3-methoxypropylamine) complex, TEB-DETA (triethylborane-diethylenetriamine) complex, TnBB-DAP (tri-n-butylborane-1,3-diaminopropane complex), and TsBB-DAP (tri-sec-butylborane-1,3-diaminopropane) are all available from BASF (Ludwigshafen, Germany). TEB-HMDA (triethylborane-hexamethylene diamine (or 1,6-hexanediamine or 1,6-diaminohexane) complex) is available from AkzoNobel (Amsterdam, The Netherlands).

The organoborane-base complex is generally employed in an effective amount, which is an amount large enough to permit reaction (i.e., curing by polymerizing and/or crosslinking) to readily occur to obtain a polymer of sufficiently high molecular weight for the desired end use. If the amount of organoborane produced is too low, then the reaction may be incomplete. On the other hand, if the amount is too high, then the reaction may proceed too rapidly to allow for effective mixing and use of the resulting composition. Useful rates of reaction will typically depend at least in part on the method of applying the composition to a substrate. Thus, a faster rate of reaction may be accommodated by using a high speed automated industrial applicator rather than by applying the composition with a hand applicator or by manually mixing the composition.

Within these parameters, an effective amount of the organoborane-base complex is an amount that preferably provides at least 0.003 percent by weight of boron, or at least 0.008 percent by weight of boron, or at least 0.01 percent by weight of boron. An effective amount of the organoborane-base complex is an amount that preferably provides up to 1.5 percent by weight of boron, or up to 0.5 percent by weight of boron, or up to 0.3 percent by weight of boron. The percent by weight of boron in a composition is based on the total weight of the polymerizable material.

Alternatively stated, an effective amount of the organoborane-base complex is at least 0.1 percent by weight, or at least 0.5 percent by weight. An effective amount of the organoborane-base complex is up to 10 percent by weight, or up to 5 percent by weight, or up to 3 percent by weight. The percent by weight of boron in a composition is based on the total weight of the polymerizable material.

Decomplexing Agents

As used herein, the term "decomplexing agent" refers to a compound capable of at least partially liberating (i.e., liberating at least some organoborane from its complexing agent) the organoborane from its complexing agent, thereby enabling initiation of the reaction (curing by polymerizing and/or crosslinking) of the polymerizable material of the composition. Decomplexing agents may also be referred to as "activators" or "liberators" and these terms may be used synonymously herein. The choice of decomplexing agent typically depends on the specific organoborane-base complex used.

Compounds that react quickly with the base or the organoborane-base complex under mild temperatures are particularly effective decomplexing agents. These may include mineral acids, Lewis acids, carboxylic acids, acid anhydrides, acid chlorides, sulfonyl chlorides, phosphonic acids, isocyanates, aldehydes, 1,3-dicarbonyl compounds, acrylates, and epoxies.

In certain embodiments, the decomplexing agent may be attached to solid particles such as silica, titanium dioxide, alumina, calcium carbonate, and carbon black.

In certain embodiments, if the organoborane is complexed with an amine, a suitable decomplexing agent is an amine-reactive compound. The amine-reactive compound liberates organoborane by reacting with the amine, thereby removing the organoborane from chemical attachment with the amine. A wide variety of materials may be used to provide the amine-reactive compound including combinations of different materials. Desirable amine-reactive compounds are those materials that can readily form reaction products with amines at or below room temperature so as to provide a composition such as an adhesive that can be easily used and cured under ambient conditions.

General classes of useful amine-reactive compounds include mineral acids (e.g., hydrochloric acid, sulfuric acid, phosphoric acid, and silicic acid), Lewis acids (e.g., $SnCl_4$ or $TiCl_4$), carboxylic acids, acid anhydrides (i.e., organic compounds that have two acyl groups bound to the same oxygen atom), acid chlorides, sulfonyl chlorides, phosphonic acids, phosphinic acids, isocyanates, aldehydes, 1,3-dicarbonyl compounds, acrylates, and epoxies. Compounds that react quickly with amines at mild temperatures, such as acids, acid anhydrides, acid chlorides, sulfonyl chlorides, and isocyanates, are particularly effective decomplexing agents. Since the thiol group is also reactive with some of these compounds, care should be taken in the separation of reactive components into different parts of the 2-part compositions.

Since the concentration of thiol groups is often greater than the concentration of primary or secondary amines in the basic complexing agent, proper selection of the decomplexing agent is desired for proper cure of the composition. In addition, strong acids, such as many mineral acids, may degrade the components of the polymerizable composition before or after reaction, and also can degrade or corrode substrates that the composition may contact. Many Lewis acids are quite reactive with thiol groups, and generate strong acids upon reaction with thiols or water (moisture) that can lead to degradation or corrosion. Owing to these facts, carboxylic acids, acid anhydrides, aldehydes, isocyanates, phosphonic acids, and 1,3-dicarbonyl compounds, such as barbituric acid, dimedone, and their derivatives, are the more versatile and preferred decomplexing agents.

Useful carboxylic acids include those having the general formula $R^{19}$—$CO_2H$, wherein $R^{19}$ represents hydrogen or a monovalent organic group. Preferably $R^{19}$ is an aliphatic group having 1 to 20 (preferably 1 to 8) carbon atoms, or an aryl group having 6 to 10 (preferably 6 to 8) carbon atoms. The aliphatic groups may comprise a straight chain or they may be branched, and may be saturated or unsaturated. The aryl groups may contain substituents such as alkyl, alkoxy, or halogen groups. Suitable acids of this type include acrylic acid, methacrylic acid, acetic acid, nonanoic acid, benzoic acid, and p-methoxybenzoic acid.

Useful carboxylic acids also include those having the general formula $R^{20}$—$CO_2H$, wherein $R^{20}$ may be a straight or branched chain, saturated or unsaturated aliphatic group of from 9 to 36 carbon atoms, preferably from 11 to 24 carbon atoms, and more preferably from 15 to 24 carbon atoms.

Yet other carboxylic acids useful as the amine-reactive compound include dicarboxylic acids and carboxylic acid esters. Such compounds may be represented by the following formula (Formula IX):

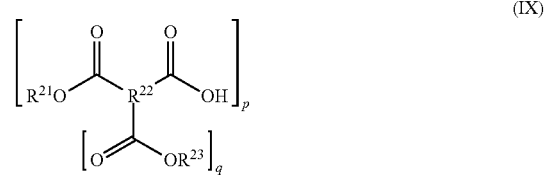

wherein:

$R^{21}$ is hydrogen, a monovalent organic group (typically having 18 atoms or less, or 8 atoms or less), or a multivalent organic group (typically having 30 atoms or less, or 10 atoms or less);

$R^{22}$ is a multivalent (i.e., (q+2)-valent) organic group (typically having 8 atoms or less, or 4 atoms or less);

$R^{23}$ is hydrogen or a monovalent organic group (typically having 18 atoms or less, or 8 atoms or less); and q is 0, 1, or 2, and the value of p is greater than or equal to one, preferably 1 to 4, more preferably 1 or 2.

In some embodiments, the carboxylic acids can be represented by the formula (Formula X):

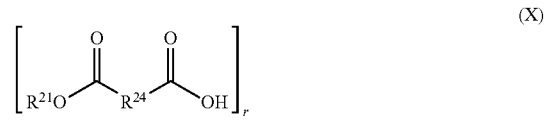

wherein:

$R^{21}$ is as defined above and r is greater than or equal to one, preferably 1 to 4, more preferably 1 or 2; and $R^{24}$ is a single bond or a divalent organic group (preferably having from 1 to 40 carbon atoms, more preferably from 1 to 10 carbon atoms or 1 to 6 carbon atoms). The organic group is often an alkylene or alkene-diyl (divalent radical of an alkene) or an arylene.

When $R^{21}$ is hydrogen and r is one, the resulting compounds of Formula (X) are dicarboxylic acids. In some embodiments, $R^{21}$ is an alkyl and r is equal to 1. In other embodiments, $R^{21}$ is an alkylene and r is equal to 2. Useful dicarboxylic acids include oxalic acid, malonic acid, succinic acid, glutaric acid, adipic acid, maleic acid, fumaric acid, phthalic acid, isophthalic acid, terephthalic acid, and dimer acid.

Other useful monofunctional or polyfunctional carboxylic acids are those that contain thioester groups or amide groups, and those that are reactive via thiol-ene chemistry, such as thioglycolic acid, 3-mercaptopropanoic acid, and the previously mentioned (meth)acrylic acid.

Polydiorganosiloxanes that contain carboxylic acid groups are also useful, such as Shin-Etsu Chemical Co. Ltd. X-22-3710 that has a carboxylic acid group at one of the terminal ends of the silicone chain, and X-22-162C that has a carboxylic acid group at each of the two termini, when the polyfunctional thiol and ethylenically-unsaturated compounds are polydiorganosiloxanes.

Compounds that easily generate carboxylic acids upon reaction with water or moisture, i.e., are easily hydrolyzed by water to form carboxylic acids, such as vinyltriacetoxysilane and (meth)acryloxypropyltriacetoxysilane are also useful.

Also preferred as amine-reactive compounds that can serve as decomplexing agents are materials having at least one anhydride group, such materials preferably represented by one of the following formulae (Formula XI and Formula XII):

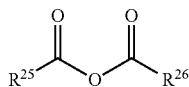

(XI)

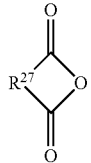

(XII)

$R^{25}$ and $R^{26}$ are organic groups which independently may be aliphatic, cycloaliphatic, or aromatic. Preferred aliphatic and cycloaliphatic groups include 1 to 17 carbon atoms, more preferably 2 to 9 carbon atoms. The aliphatic and cycloaliphatic groups can be saturated or unsaturated. Preferred aromatic groups include phenyl, optionally substituted with 1 to 4 carbon atom aliphatic groups.

$R^{27}$ is a divalent organic group that completes a cyclic structure with the anhydride group to form, for example, a 5- or 6-membered ring. $R^{27}$ may be aliphatic, cycloaliphatic, aromatic, or a combination. The aliphatic and cycloaliphatic groups can be saturated or unsaturated. Preferably, $R^{27}$ is an aliphatic group having 2 to 20, more preferably 2 to 12 carbon atoms. The $R^{27}$ group may also contain heteroatoms such as oxygen or nitrogen provided that any heteroatom is not adjacent to the anhydride functionality. The $R^{27}$ group may also be part of a cycloaliphatic or aromatic fused ring structure, either of which may be optionally substituted with aliphatic groups. $R^{27}$ may be substituted with one or more carboxylic acid groups, any two of which, when on adjacent carbons (i.e., covalently bonded carbons) can be cyclized to form another anhydride group.

Suitable anhydrides of Formula (XI) are propionic anhydride, methacrylic anhydride, hexanoic anhydride, decanoic anhydride, lauric anhydride, and benzoic anhydride. Suitable anhydrides of Formula (XII) are maleic anhydride, succinic anhydride, methylsuccinic anhydride, 2-octen-1-ylsuccinic anhydride, 2-dodecen-1-ylsuccinic anhydride, dodecenylsuccinic anhydride (mixture of isomers), cyclohexanedicarboxylic anhydride, cis-5-norbornene-endo-2,3-dicarboxylic anhydride, methyl-5-norbornene-2,3-dicarboxylic anhydride, phthalic anhydride, trimellitic anhydride, and pyromellitic anhydride. The presence of an ethylenically-unsaturated group in the anhydride-functional amine reactive compound, such as would be the case for maleic anhydride, may permit the same to react with the other thiol-containing or ethylenically-unsaturated components.

Other useful amine-reactive compounds having at least one anhydride group are copolymers of maleic anhydride, such as the copolymers of maleic anhydride and styrene, the copolymers of maleic anhydride and ethylene or α-olefins, and the copolymers of maleic anhydride and (meth)acrylates. Also, polymeric materials in which maleic anhydride has been grafted onto the polymer to form, for example, succinic anhydride-functional polymers are suitable. Polydiorganosiloxanes that contain anhydrides are also useful, such as Gelest, Inc. succinic anhydride-terminated polydimethylsiloxane, DMS-Z21, when the polyfunctional thiol and ethylenically-unsaturated compounds are polydiorganosiloxanes.

Suitable aldehydes useful as the amine-reactive compounds that serve as decomplexing agents may include those represented by the formula (Formula XIII):

(XIII)

wherein $R^{28}$ is a monovalent organic group such as, for example, an alkyl group having 1 to 10 carbon atoms (in some embodiments, 1 to 4 carbon atoms), or an aryl group having 6 to 10 carbon atoms (in some embodiments, 6 to 8 carbon atoms). In this formula, the alkyl groups may be straight or branch-chained, and may contain substituents such as halogen, hydroxy, and alkoxy. The aryl groups may contain substituents such as halogen, hydroxy, alkoxy, alkyl, and nitro. One preferred $R^{28}$ group is aryl. Exemplary compounds of this type include: benzaldehyde; o-, m- and p-nitrobenzaldehyde; 2,4-dichlorobenzaldehyde; p-tolylaldehyde; and 3-methoxy-4-hydroxybenzaldehyde. Blocked aldehydes such as acetals and dialdehydes, may also be used.

Other suitable decomplexing agents may include 1,3-dicarbonyl compounds (e.g., beta-ketones), for example, as described in U.S. Pat. No. 6,849,569 (Moren). Exemplary 1,3-dicarbonyl compound decomplexing agents include methyl acetoacetate, ethyl acetoacetate, t-butyl acetoacetate, 2-methacryloyloxyethyl acetoacetate, diethylene glycol bis(acetoacetate), polycaprolactone tris(acetoacetate), polypropylene glycol bis(acetoacetate), poly(styrene-co-allyl acetoacetate), N,N-dimethylacetoacetamide, N-methylacetoacetamide, acetoacetanilide, ethylene bis(acetoacetamide), polypropylene glycol bis(acetoacetamide), acetoacetamide, and acetoacetonitrile. Preferable 1,3-dicarbonyl compounds are dimedone, barbituric acid and their derivatives (e.g., 1,3-dimethyl barbituric acid, 1-phenyl-5-benzyl barbituric acid, and 1-ethyl-5-cyclohexyl barbituric acid).

Examples of suitable isocyanate decomplexing agents include, but are not limited to, polyfunctional isocyanates, such as isophorone diisocyanate, hexamethylene diisocyanate, methylene diphenyl diisocyanate, toluene diisocyanate, and their prepolymers. Additionally, 2-isocyanatoethyl methacrylate alone or its copolymers with, e.g., other (meth)acrylates are suitable decomplexing agents.

Examples of suitable phosphonic acid decomplexing agents include vinylphosphonic acid, phenylphosphonic acid, methylphosphonic acid, and octadecylphosphonic acid.

Preferred compounds capable of decomplexing the organoborane-amine complex include, for example, a carboxylic acid, an acid anhydride, an aldehyde, an isocyanate, a phosphonic acid, or a 1,3-dicarbonyl.

In the cases when the organoborane is complexed to an amidine, alkoxide, or hydroxide, suitable decomplexing agents are the same as described above for amine complexing agents. When the organoborane is complexed to an alkoxide, hydroxide, or amidine, which is protic, i.e., at least one of the nitrogen atoms are substituted with hydrogen, the preferred decomplexing agents include, for example, a carboxylic acid, an acid anhydride, an isocyanate, a phosphonic acid, or a 1,3-dicarbonyl. When the organoborane is complexed to an amidine, which is aprotic (i.e., none of the nitrogen atoms are substituted with hydrogen), the preferred decomplexing agents include, for example, a carboxylic acid, an acid anhydride, a phosphonic acid, or a 1,3-dicarbonyl.

The decomplexing agent is typically used in an effective amount (i.e., an amount effective to promote reaction (i.e., curing by polymerizing and/or crosslinking) by liberating the initiator from its complexing agent, but without materially adversely affecting desired properties of the ultimate composition). As recognizable to one of ordinary skill in the art, too much of the decomplexing agent may cause reaction to proceed too quickly. However, if too little decomplexing agent is used, the rate of reaction may be too slow and the resulting polymers may not be of adequate molecular weight for certain applications. A reduced amount of decomplexing agent may be helpful in slowing the rate of reaction if it is otherwise too fast. Thus, within these parameters, the decomplexing agent is typically provided in an amount such that the molar ratio of amine-, amidine-, hydroxide-, or alkoxide-reactive groups in the decomplexing agent(s) to amine, amidine, hydroxide or alkoxide groups in the complexing agent(s) is in the range of 0.5:1.0 to 10.0:1.0. For better performance, preferably the ratio of amine-, amidine-, hydroxide-, or alkoxide-reactive groups in the decomplexing agent(s) to amine-, amidine, hydroxide, or alkoxide groups in the complexing agent(s) is in the range of 0.5:1.0 to 4.0:1.0, preferably 1.0:1.0.

Hydroperoxide

Polymerizable compositions according to the present disclosure include at least one hydroperoxide. In multi-part compositions, the hydroperoxide can be in Part A, Part B, or in any other part. In some embodiments, the hydroperoxide is not in the same part as the organoborane-base complex. Examples of suitable hydroperoxides include hydrogen peroxide and organic hydroperoxides (e.g., hydrocarbyl hydroperoxides).

While organic peroxides generally may be useful additives for decreasing the cure time in applications that require relatively thick coating (e.g., coating thickness greater than 0.25 mm, or greater than 0.50 mm, or greater than 1.00 mm), hydroperoxides (e.g., organic hydroperoxides) unexpectedly are much more effective at increasing the rate of cure than other peroxides such as, for example, dialkyl peroxides. Combinations of more than one hydroperoxide (e.g., hydrogen peroxide and/or organic hydroperoxide(s)) may also be used.

In some preferred embodiments, the hydroperoxide is a tertiary hydroperoxide, i.e., an organic hydroperoxide where the hydroperoxy group (—OOH) is bound to a tertiary carbon atom. In some embodiments the organic hydroperoxide comprises a tertiary-hydrocarbyl (including cyclic, branched, and/or linear alkyl groups, and/or aryl groups) hydroperoxide, preferably having from 4 to 15 carbon atoms.

Exemplary organic hydroperoxides include tertiary hydroperoxides (e.g., isopropylcumyl hydroperoxide, cumyl hydroperoxide, tert-butyl hydroperoxide, tert-amyl hydroperoxide, and 1,1,3,3-tetramethylbutyl hydroperoxide), available from Akzo Nobel NV, Amsterdam, The Netherlands, under the trade designation TRIGONOX. Additional hydroperoxides include trans-5-phenyl-4-pentenyl hydroperoxide, alkane hydroperoxides (e.g., propane hydroperoxide, n-octane hydroperoxide, isohexane hydroperoxide, isopentane hydroperoxide, cyclohexane hydroperoxide, cyclopentane hydroperoxide, methylcyclohexane hydroperoxide, decalin hydroperoxide, and tetralin hydroperoxide), toluene hydroperoxide, diphenylmethyl hydroperoxide, triphenylmethyl hydroperoxide, trinaphthylmethyl hydroperoxide, cymene hydroperoxide, and phenylethyl hydroperoxide.

Typically, the hydroperoxide is included in compositions according to the present disclosure in at least an effective amount (i.e., to provide sufficient degree of cure in a timeframe suitable for the intended application), although other amounts may also be used. For example, in a 2-part system, the amount of hydroperoxide may be higher in one part, so that when mixed, the diluted concentration is as desired. In some embodiments, the molar ratio of hydroperoxy groups (—OOH) provided by the hydroperoxide to boron atoms provided by the organoborane is from about 0.2 to 1.0, and in some embodiments from 0.4 to 0.8.

Polymerizable Ethylenically-Unsaturated Compounds

Suitable polymerizable ethylenically-unsaturated compounds are those compounds (e.g., monomer, oligomer, polymerizable polymer) that include a plurality of ethylenically-unsaturated groups. Such compounds are often referred to as "polyfunctional".

Many types of ethylenically-unsaturated groups are feasible including internal and terminal ethylenically-unsaturated groups. However, the unsaturation associated with aromaticity, e.g., in a benzene ring is not suitable. Alkenyl and alkynyl groups are useful. The groups can be unconjugated or conjugated with other carbon-carbon, carbon-oxygen, or carbon-nitrogen unsaturation, such as in the case of 1,3-dienes, fumarate esters, and maleate esters.

In general, terminal ethylenically-unsaturated groups, such as vinyl, allyl, and ethynyl groups, are more reactive and, thus, preferred when relatively fast cure rates are desired under ambient conditions (the exception being norbornenes, which are highly reactive, and maleimides, which are moderately reactive, thus, also preferred). Preferred ethylenically-unsaturated compounds include vinyls, allyls, ethynyls, norbornenyls, and maleimides. Vinyls include, but are not limited to, vinyl ethers, vinyl silicones (i.e., polydiorganosiloxanes with vinyl groups covalently bonded to silicon), N-vinyl amides, vinyl aliphatics (e.g., 1,9-decadiene), vinyl aromatics (e.g., divinylbenzene), vinyl esters, (meth)acrylates, and (meth)acrylamides. Allyls include, but are not limited to, allyl ethers, allyl esters, allyl carbamates, allyl amines, allyl amides (which include allyl imides, allyl isocyanurates, and allyl ureas), allyl cyanurates, and allyltriazines.

Exemplified polyfunctional ethylenically-unsaturated compounds include vinyl ethers, vinyl silicones, vinyl aliphatics, (meth)acrylates, allyl ethers, allyl esters, and allyl amides (allyl isocyanurate).

Suitable polyfunctional allyl ethers include trimethylolpropane diallyl ether, pentaerythritol tetraallyl ether (also referred to as allyl pentaerythritol), dipentaerythritol hexaallyl ether, trimethylolpropane triallyl ether, ethylene glycol diallyl ether, and diethylene glycol diallyl ether.

Suitable polyfunctional allyl amides (i.e., N-allyl amides) include N,N'-diallyltartramide, 1,3-diallyl urea, and triallyl isocyanurate, as well as N,N'-diallylamides synthesized from allylamine and dicarboxylic acids or their acid chlorides, and N,N-diallylamides synthesized from diallylamine and carboxylic acids or their acid chlorides. Preferred polyfunctional allyl amide is triallyl isocyanurate.

Suitable ethylenically-unsaturated compounds include polyfunctional (meth)acrylate monomers. As used herein the terms "(meth)acrylate" and "(meth)acrylic" and the plural forms thereof are meant to include acrylate and/or methacrylate species of the designated compound. For example, the term "ethyl (meth)acrylate" is meant to include ethyl acrylate and/or ethyl methacrylate. Suitable (meth)acrylic acid derivatives are, for example, the (meth)acrylic esters of polyhydric alcohols.

Suitable di(meth)acrylates include 1,3-butylene glycol di(meth)acrylate, 1,4-butanediol di(meth)acrylate, 1,6-hexanediol di(meth)acrylate, 1,6-hexanediol mono acrylate monomethacrylate, ethylene glycol di(meth)acrylate, alkoxylated aliphatic di(meth)acrylate, alkoxylated cyclohexanedimethanol di(meth)acrylate, alkoxylated hexanediol di(meth)acrylate, alkoxylated neopentyl glycol di(meth)acrylate, caprolactone modified neopentyl glycol hydroxypivalate di(meth)acrylate, cyclohexanedimethanol di(meth)acrylate, diethylene glycol di(meth)acrylate, dipropylene glycol di(meth)acrylate, ethoxylated (10) bisphenol A di(meth)acrylate, ethoxylated (3) bisphenol A di(meth)acrylate, ethoxylated (30) bisphenol A di(meth)acrylate, ethoxylated (4) bisphenol A di(meth)acrylate, ethoxylated (4) bisphenol A di(meth)acrylate, hydroxypivalaldehyde modified trimethylolpropane di(meth)acrylate, neopentyl glycol di(meth)acrylate, polyethylene glycol (200) di(meth)acrylate, polyethylene glycol (400) di(meth)acrylate, polyethylene glycol (600) di(meth)acrylate, propoxylated neopentyl glycol di(meth)acrylate, tetraethylene glycol di(meth)acrylate, tricyclodecanedimethanol di(meth)acrylate, triethylene glycol di(meth)acrylate, and tripropylene glycol di(meth)acrylate.

Suitable tri(meth)acrylates include glycerol tri(meth)acrylate, trimethylolpropane tri(meth)acrylate, ethoxylated tri(meth)acrylates (for example, ethoxylated (3) trimethylolpropane tri(meth)acrylate, ethoxylated (6) trimethylolpropane tri(meth)acrylate, ethoxylated (9) trimethylolpropane tri(meth)acrylate, ethoxylated (15) trimethylolpropane tri(meth)acrylate, ethoxylated (20) trimethylolpropane tri(meth)acrylate), pentaerythritol tri(meth)acrylate, propoxylated tri(meth)acrylates (for example, propoxylated (3) glyceryl tri(meth)acrylate, propoxylated (5.5) glyceryl tri(meth)acrylate, propoxylated (3) trimethylolpropane tri(meth)acrylate, propoxylated (6) trimethylolpropane tri(meth)acrylate), trimethylolpropane tri(meth)acrylate, and tris(2-hydroxyethyl)isocyanurate tri(meth)acrylate, which is also referred to as tris(2-(meth)acryloyloxyethyl)isocyanurate.

Suitable higher functionality (meth)acrylic compounds include ditrimethylolpropane tetra(meth)acrylate, dipentaerythritol penta(meth)acrylate, ethoxylated (4) pentaerythritol tetra(meth)acrylate, pentaerythritol tetra(meth)acrylate, and caprolactone modified dipentaerythritol hexa(meth)acrylate.

Suitable oligomeric polymerizable (meth)acrylic compounds include urethane (meth)acrylates, polyester (meth)acrylates, polybutadiene (including hydrogenated polybutadiene) (meth)acrylates, and epoxy (meth)acrylates.

Suitable (meth)acrylates include (meth)acrylic acid esters of polyhydric alcohols, such as, for example, ethylene glycol, diethylene glycol, polyethylene glycol, trimethylolpropane, triethylene glycol, tetraethylene glycol, dipropylene glycol, tripropylene glycol, tetrapropylene glycol, pentapropylene glycol and polypropylene glycol; ethoxylated or propoxylated diphenylolpropane and hydroxy-terminated polyurethanes.

Suitable ethylenically-unsaturated compounds include polyfunctional (meth)acrylamide monomers. As used herein the terms "(meth)acrylamide" and the plural form thereof are meant to include acrylamide and/or methacrylamide species of the designated compound.

Suitable polyfunctional (meth)acrylamides include 1,4-bis((meth)acryoyl)piperazine, bis-(meth)acrylamide (also referred to as N,N'-methylenedi(meth)acrylamide), N,N'-(1, 2-dihydroxyethylene)bis(meth)acrylamide, as well as polyfunctional (meth)acrylamides that can be formed from reaction of (meth)acrylic acid or its acid chloride with primary and/or secondary amines, such as 1,3-diaminopropane, N,N'-dimethyl-1,3-diaminopropane, 1,4-diaminobutane, polyamidoamines, and polyoxyalkylenepolyamines.

Suitable polyfunctional vinyl ethers include 1,4-cyclohexanedimethanol divinyl ether, diethylene glycol divinyl ether, triethylene glycol divinyl ether, poly(ethylene glycol) divinyl ether, and butanediol divinyl ether.

Suitable polyfunctional vinyl polydiorganosiloxanes (also referred to as vinyl silicones) include vinyl-terminated polydimethylsiloxanes, such as Gelest, Inc. DMS-V21, DMS-V22, DMS-V31, DMS-V35, and DMS-V42; and vinyl-terminated diphenylsiloxane-dimethylsiloxane copolymers, such as Gelest, Inc. PDV-0325, PDV-0331, PDV-0525, PDV-1625, PDV-1631, and PDV-1635; and polydimethylsiloxanes containing vinyl groups bonded to silicon atoms internal along the polymer chain and not at its termini, and referred to as vinylmethylsiloxane-dimethylsiloxane copolymers, trimethylsiloxy terminated, such as Gelest, Inc. VDT-131, VDT-153, VDT-431, VDT-731, and VDT-954; and polydimethylsiloxanes that contain vinyl groups both internally and at the termini, and referred to as vinylmethylsiloxane-dimethylsiloxane copolymers, vinyl terminated, such as Gelest Inc. VDV-0131.

Suitable polyfunctional vinyl aliphatics include 1,9-decadiene, and 1,2,4-trivinylcyclohexane, and polybutadiene, wherein some of the 1,3-butadiene has been incorporated by 1,2-addition.

Suitable polyfunctional allyl esters include diallyl succinate, diallyl adipate, diallyl isophthalate, diallyl phthalate, and triallyl trimellitate.

Suitable norbornenes include 2,5-norbornadiene, 5-vinyl-2-norbornene, 5-ethylidene-2-norbornene, 5-methylene-2-norbornene, dicyclopentadiene, terpolymers of ethylene, propylene, and a diene monomer, in which the diene monomer is 2,5-norbornadiene, 5-vinyl-2-norbornene, 5-ethylidene-2-norbornene, 5-methylene-2-norbornene, or dicyclopentadiene, and (bicycloheptenyl)ethyl-terminated polydimethylsiloxanes, such as Gelest, Inc. DMS-NB25 and DMS-NB32.

Suitable polyfunctional maleimides include bismaleimides, which are synthesized by the reaction of maleic anhydride and aliphatic or aromatic primary amines, such as 1,4-diaminobutane, 1,6-diaminohexane, 4,4'-methylenedianiline, 4,4'-oxydianiline, phenylenediamines, and polyamidoamines.

Various combinations of the polymerizable ethylenically-unsaturated compounds may be used. Preferred combinations include miscible mixtures. It is noted that vinyl silicones and (bicycloheptenyl)ethyl-terminated polydimethylsiloxanes, however, may not be miscible with others listed herein. Further, when the ethylenically-unsaturated compound is a polydiorganosiloxane, typically the thiol-containing compound is also a polydiorganosiloxane.

Thiol-Containing Compounds

Suitable polymerizable thiol-containing compounds are those compounds (e.g., monomer, oligomer, polymerizable polymer (i.e., prepolymer) that include a plurality of thiol groups (—SH groups also referred to as mercapto groups) in which the sulfur atom of the thiol group is covalently bonded to carbon (i.e., through C—S bonds). Such compounds are often referred to as "polyfunctional" thiols or polythiols.

Examples of suitable polythiols include aliphatic monomeric polythiols (ethane dithiol, hexamethylene dithiol, decamethylene dithiol, tolylene-2,4-dithiol, and the like), aromatic monomeric polythiols (benzene-1,2-dithiol, benzene-1,3-dithiol, benzene-1,4-dithiol, and the like), and some polymeric polythiols such as a thiol-terminated ethylcyclohexyl dimercaptan polymer, and the like.

Other useful polythiols are described in U.S. Pat. No. 6,605,687 (Gross et al.), and include dimercaptodiethyl sulfide, 1,6-hexanedithiol, 1,8-dimercapto-3,6-dithiaoctane, propane-1,2,3-trithiol, 1,2-bis[(2-mercaptoethyl)thio]-3-mercaptopropane, tetrakis(7-mercapto-2,5-dithiaheptyl) methane, and trithiocyanuric acid.

Preferred polythiols useful in the present disclosure include polythiols formed from the esterification of polyols with thiol-containing carboxylic acids or their derivatives. Examples of polythiols formed from the esterification of polyols with thiol-containing carboxylic acids or their derivatives include those made from the esterification reaction between thioglycolic acid or 3-mercaptopropionic acid and several polyols to form the mercaptoacetates or mercaptopropionates, respectively.

Examples of the polythiol compounds preferred because of relatively low odor level include, but are not limited to, esters of thioglycolic acid (HS—$CH_2$COOH), α-mercaptopropionic acid (HS—CH($CH_3$)—COOH) and β-mercaptopropionic acid, also referred to as 3-mercaptopropionic acid (HS—$CH_2CH_2$COOH) with polyhydroxy compounds (polyols) such as diols (e.g., glycols), triols, tetraols, pentaols, hexaols, and the like. Specific examples of such polythiols include, but are not limited to, ethylene glycol bis(thioglycolate), ethylene glycol bis(β-mercaptopropionate), trimethylolpropane tris(thioglycolate), trimethylolpropane tris(β-mercaptopropionate) and ethoxylated versions, pentaerythritol tetrakis(thioglycolate), pentaerythritol tetrakis(β-mercaptopropionate), and tris(hydroxyethyl)isocyanurate tris(β-mercaptopropionate).

Suitable materials are commercially available under the trade designations THIOCURE PETMP (pentaerythritol tetra-3-mercaptopropionate), TMPMP (trimethylolpropane tri(3-mercaptopropionate), ETTMP (ethoxylated-trimethylolpropane tri-3-mercaptopropionate) such as ETTMP 1300 and ETTMP 700, GDMP glycol di(3-mercaptopropionate), TMPMA (trimethylolpropane trimercaptoacetate), TEMPIC (tris[2-β-mercaptopropionyloxy)ethyl]), and PPGMP (propylene glycol 3-mercaptopropionate) from Bruno Bock Chemische Fabrik GmbH & Co. KG. A specific example of a polymeric polythiol is polypropylene-ether glycol bis(β-mercaptopropionate), which is prepared from polypropylene-ether glycol (e.g., PLURACOL P201, Wyandotte Chemical Corp.) and β-mercaptopropionic acid by esterification.

Other useful polythiols can be formed from the addition of hydrogen sulfide ($H_2S$) (or its equivalent) across carbon-carbon double bonds. For example, dipentene and triglycerides which have been reacted with $H_2S$ (or its equivalent). Specific examples include dipentene dimercaptan and those polythiols available under the trade designations POLYMERCAPTAN 358 (mercaptanized soybean oil), and POLYMERCAPTAN 805C (mercaptanized castor oil) from Chevron Phillips Chemical Co. LLP. At least for some applications, the preferred polythiols are POLYMERCAPTAN 358 and 805C since they are produced from largely renewable materials, i.e., the triglycerides, soybean oil and castor oil, and have relatively low odor in comparison to many thiols. Useful triglycerides have at least 2 sites of unsaturation, i.e., carbon-carbon double bonds, per molecule on average, and sufficient sites are converted to result in at least 2 thiols per molecule on average. In the case of soybean oil, this requires a conversion of approximately 42 percent or greater of the carbon-carbon double bonds, and in the case of castor oil this requires a conversion of approximately 66 percent or greater of the carbon-carbon double bonds. Typically, higher conversion is preferred, and POLYMERCAPTAN 358 and 805C can be obtained with conversions greater than approximately 60 percent and 95 percent, respectively.

Other useful polythiols can be formed from the ring-opening reaction of epoxides with $H_2S$ (or its equivalent). Preferred polythiols of this type include those available under the trade designations POLYMERCAPTAN 407 (mercaptohydroxy soybean oil) from Chevron Phillips Chemical Co. LLP, and CAPCURE, specifically CAPCURE 3-800 (a polyoxyalkylene triol with mercapto end groups of the structure R[O($C_3H_6$O)$_n$—$CH_2$—CH(OH)—$CH_2$SH]$_3$ wherein R represents an aliphatic hydrocarbon group having 1-12 carbon atoms and n is an integer from 1 to 25), formerly from BASF, Inc. (and now Gabriel Performance Products, Ashtabula, Ohio), and GPM-800, which is equivalent to CAPCURE 3-800, and from Gabriel Performance Products.

Other useful polythiols of this type include those derived from the reaction of $H_2S$ (or its equivalent) with the glycidyl ethers of bisphenol A epoxy resins, bisphenol F epoxy resins, and novolak epoxy resins. A preferred polythiol of this type is QX11, derived from bisphenol A epoxy resin, from Japan Epoxy Resins (JER) under the trade designation EPOMATE. Other polythiols suitable include those available under the trade designations EPOMATE QX10 and QX20 from JER.

Other useful polythiols are polysulfides that contain thiol groups such as those available under the trade designations THIOKOL LP-2, LP-3, LP-12, LP-31, LP-32, LP-33, LP-977, and LP-980 from Toray Fine Chemicals Co., Ltd.

Still other useful polythiols include polythioether oligomers and polymers such as those described in U.S. Provisional Pat. Appln. No. 62/116,019 (DeMoss et al.) entitled "Cold Tolerant Sealants and Components Thereof", filed Feb. 13, 2015, and references included therein.

Another type of polythiol, thiol-containing silicones is preferred when the ethylenically-unsaturated compound is a polydiorganosiloxane. Polydimethylsiloxanes in which some of the methyl groups have been replaced by mercaptoalkyl groups are preferred. Specific examples include those available under the trade designations SMS-022 and SMS-042 (from Gelest Inc.), as well as KF-2001 and KF-2004 (from Shin-Etsu Chemical Co. Ltd. (Tokyo, Japan)), in which some silicon atoms internal to the polymer chain, i.e., not at the termini, are substituted with mercaptoalkyl groups. Another preferred silicone is Shin-Etsu Chemical Co. Ltd. X-22-167B, in which both terminal silicon atoms are substituted with mercaptoalkyl groups.

Various combinations of the polymerizable thiol-containing compounds may be used. Preferred combinations include miscible mixtures. It is noted that thiol-containing silicones, however, may not be miscible with other thiol containing compounds listed herein.

It is noted that thiol-containing silicones (i.e., polydiorganosiloxanes) may not be suitable for combination (or mixture) with many of the ethylenically-unsaturated compounds due to their lack of miscibility with these compounds and their high price. However, in the case where the ethylenically-unsaturated compound is also a silicone (i.e., polydiorganosiloxane), the thiol-containing polydiorganosiloxanes are preferred due to their miscibility with these ethylenically-unsaturated polydiorganosiloxanes and the lack of miscibility of the non-silicone polythiols with these silicones that contain the ethylenically-unsaturated groups.

Exemplary thiol-containing compounds include those prepared from esterification of polyols with thiol-containing carboxylic acids or their derivatives, those prepared from a ring-opening reaction of epoxides with $H_2S$ (or its equivalent), those prepared from the addition of $H_2S$ (or its equivalent) across carbon-carbon double bonds, polysulfides, polythioethers, and polydiorganosiloxanes. Specifically, these include the 3-mercaptopropionates (also referred to as β-mercaptopropionates) of ethylene glycol and trimethylolpropane (the former from Evans Chemetrics, now part of Bruno Boch, the latter from Sigma-Aldrich); POLYMERCAPTAN 805C (mercaptanized castor oil); CAPCURE 3-800 (a polyoxyalkylene triol with mercapto end groups of the structure $R[O(C_3H_6O)_n-CH_2-CH(OH)-CH_2SH]_3$ wherein R represents an aliphatic hydrocarbon group having 1-12 carbon atoms and n is an integer from 1 to 25); THIOKOL LP-3 polysulfide; and GELEST SMS-022 and SMS-042 (polydimethylsiloxanes in which some of the methyl groups have been replaced by mercaptoalkyl groups).

In certain embodiments, the weight percent (wt. %) of the thiol-containing compound is at least 1 wt. %, or at least 10 wt. %, or at least 20 wt. %, or at least 30 wt. %, or at least 40 wt. % of the total weight of the thiol-containing and ethylenically-unsaturated compounds. In certain embodiments, the weight percent of the thiol-containing compound is up to 99 wt. %, or up to 90 wt. %, or up to 80 wt. %, or up to 70 wt. %, or up to 60 wt. % of the total weight of the thiol-containing and ethylenically-unsaturated compounds. In certain embodiments, the weight percent of the ethylenically-unsaturated compound is at least 1 wt. %, or at least 10 wt. %, or at least 20 wt. %, or at least 30 wt. %, or at least 40 wt. % of the total weight of the thiol-containing and ethylenically-unsaturated compounds. In certain embodiments, the weight percent of the ethylenically-unsaturated compound is up to 99 wt. %, or up to 90 wt. %, or up to 80 wt. %, or up to 70 wt. %, or up to 60 wt. % of the total weight of the thiol-containing and ethylenically-unsaturated compounds.

In certain embodiments, the amount of the thiol groups from the thiol-containing compounds and the amount of ethylenically-unsaturated groups from the ethylenically-unsaturated compounds are present in a molar ratio range of 0.25:1.0 to 4.0:1.0, or 0.33:1.0 to 3.0:1.0, or 0.5:1.0 to 2.0:1.0, or 0.75:1.0 to 1.33:1.0, or 0.80:1.0 to 1.25:1.0 (thiol groups:ethylenically-unsaturated groups). In some specific embodiments, the molar ratio is preferably 0.5:1.0 to 2.0:1.0. In certain embodiments, for example where crosslinking of high molecular weight polymers that contain an ethylenically-unsaturated repeating unit, such as 1,2-polybutadiene or unsaturated polyesters, is desired, the amount of thiol groups and the amount of ethylenically-unsaturated groups may be present in a molar range of 0.005:1.0 to 0.20:1.0 (thiol groups:ethylenically-unsaturated groups).

Optional Additives

Compositions according to the present disclosure (whether multi-part or unitary) can include other optional additives. These optional additives can be, e.g., in Part A, Part B, or in any other part. Peroxygen compounds other than hydroperoxides may be useful additives for adjusting or customizing the cure profile (i.e., the degree of cure vs. time). Examples of useful peroxygen compounds are organic peroxides, other than organic hydroperoxides, that have half-lives of 10 hours at temperatures of approximately 90° C. or greater, such as 1,1-di(tert-butylperoxy)cyclohexane, tert-amylperoxy 2-ethylhexy carbonate, tert-amyl peroxyacetate, 2,2-di(tert-butylperoxy)butane, tert-butylperoxy isopropyl carbonate, dicumyl peroxide, tert-butyl peroxy-3,5,5-trimethylhexanoate, 2,5-dimethyl-2,5-di(tert-butylperoxy)hexane, di-tert-butyl peroxide, 2,5-dimethyl-2,5-di(tert-butylperoxy)hexyne-3, and tert-butyl cumyl peroxide. In certain embodiments, the various compositions according to the present disclosure are free of peroxygen compounds other than hydroperoxides (e.g., organic hydroperoxides and/or hydrogen peroxide).

Another particularly useful additive is a thickener, such as medium (e.g., 40,000 grams/mole) molecular weight polybutyl methacrylate that may generally be incorporated in an amount of up to 50 percent by weight, based on the total weight of the polymerizable monomers. Thickeners may be employed to increase the viscosity of the resulting composition to a more easily applied viscous syrup-like consistency.

Yet another particularly useful additive is an elastomeric material. These materials can improve the fracture toughness of compositions made therewith, which can be beneficial when, for example, bonding stiff, high yield strength materials (e.g., metal substrates that do not mechanically absorb energy as easily as other materials, such as flexible polymeric substrates). Such additives can generally be incorporated in an amount of up to 50 percent by weight, based on the total weight of the composition.

Core-shell polymers can also be added to modify spreading and flow properties of the composition. These enhanced properties may be manifested by a reduced tendency for the composition to leave an undesirable "string" upon dispensing from a syringe-type applicator, or sag or slump after having been applied to a vertical surface. Accordingly, use of more than 20 percent by weight, based on total weight of the composition, of a core-shell polymer additive may be desirable for achieving improved sag-slump resistance. Core-shell polymers can also improve the fracture toughness of compositions made therewith, which can be beneficial when, for example, bonding stiff, high yield strength materials (e.g., metal substrates that do not mechanically absorb energy as easily as other materials, such as flexible polymeric substrates).

Small amounts of inhibitors, such as hydroquinone monomethyl ether, 2,6-di-(tert-butyl-1,2-dihydroxybenzene, 2,6-di-(tert-butyl)-4-methyl-phenol, pyrogallic acid, and tris (N-nitroso-N-phenylhydroxylamine) aluminum salt may be used in polymerizable compositions, for example, to prevent reaction or reduce degradation of the polymerizable monomers during storage. Inhibitors may be added in an amount that does not materially affect the rate of curing or the ultimate properties of polymers made therewith. Accordingly, inhibitors are generally useful in amounts of 100-30,000 parts per million (ppm) based on the total weight of polymerizable monomers in a polymerizable composition.

Other possible additives include UV absorbers and light stabilizers, flame retardants, plasticizers, adhesion promoters, non-reactive diluents, non-reactive colorants, tackifiers, fillers (e.g., carbon black, hollow glass/ceramic beads, silica, titanium dioxide, calcium carbonate, solid glass/ceramic spheres, electrically and/or thermally conductive particulate, such as metal particles, graphite, alumina trihydrate (also referred to as aluminum hydroxide), alumina, boron nitride, and silicon carbide, glass/ceramic fiber, carbon fiber, antistatic compounds, and chalk), and the like. The various optional additives are employed in any amount, but generally amounts that do not significantly adversely affect the curing process or the desired properties of polymers made therewith.

Combinations

Multi-part compositions according to the present disclosure are provided as at least a part A composition (part A) and a part B composition (part B), with these parts being mixed prior to use of the composition (e.g., application of the composition to a substrate). In this way, activation of the organoborane can be delayed until parts A and B are combined.

More specifically, compositions of the present disclosure are multi-part polymerizable compositions that include at least two parts: a part A composition that includes an organoborane-base complex; and a part B composition that includes a decomplexing agent. These two parts are kept separate until reaction is desired. The polymerizable components can be in part A, part B, or another part distinct from parts A and B. The polymerizable ethylenically-unsaturated component and the thiol-containing component can be separate or together in part A, part B, or another part distinct from parts A and B. The hydroperoxide can be in part A, part B, or another part distinct from parts A and B. Various combinations can be envisioned.

For a two-part composition in which part A includes an organoborane-base complex and part B includes a decomplexing agent, the following combinations of the polymerizable ethylenically-unsaturated component and the thiol-containing component can be created:

(1) the polymerizable thiol-containing and ethylenically-unsaturated components are only in Part A;

(2) the polymerizable thiol-containing and ethylenically-unsaturated components are only in Part B;

(3) all of the polymerizable thiol-containing component is in Part A and all of the polymerizable ethylenically-unsaturated component is in Part B;

(4) all of the polymerizable ethylenically-unsaturated component is in Part A and all of the polymerizable thiol-containing component is in Part B;

(5) each of Part A and Part B include a portion of the polymerizable thiol-containing component and a portion of the polymerizable ethylenically-unsaturated component;

(6) Part A includes a portion of the polymerizable thiol-containing component and all of the polymerizable ethylenically-unsaturated component, and Part B includes a portion of the polymerizable thiol-containing component;

(7) Part A includes all of the polymerizable thiol-containing component and a portion of the polymerizable ethylenically-unsaturated component, and Part B includes a portion of the polymerizable ethylenically-unsaturated component;

(8) Part A includes a portion of the polymerizable thiol-containing component, and Part B includes a portion of the polymerizable thiol-containing component and all of the polymerizable ethylenically-unsaturated component; and (9) Part A includes a portion of the polymerizable ethylenically-unsaturated component, and Part B includes a portion of the polymerizable ethylenically-unsaturated component and all of the polymerizable thiol-containing component.

In certain situations compatibility between the organoborane-base complex or the decomplexing agent and the polymerizable components as it relates to the stability of the components needs to be considered when determining the various combinations. In addition, compatibility of the polymerizable components (i.e., the polyfunctional thiol-containing compounds and the polyfunctional ethylenically-unsaturated compounds) needs to be considered.

Two-part compositions are preferred due to cost considerations, as is long shelf life.

When a two-part composition is used, in addition to separating the organoborane-base complex from the decomplexing agent, stability of the combinations with the other components should be considered. For example, preferred stable combinations include: an organoborane-base complex with a vinyl ether, vinyl aliphatic, allyl ether, or allyl amide; and a polythiol with a decomplexing agent selected from a carboxylic acid, acid anhydride, 1,3-dicarbonyl, isocyanate, aldehyde, or phosphonic acid. More preferred combinations include: an organoborane-base complex with a vinyl ether, vinyl aliphatic, allyl ether, or allyl amide; and a polythiol with a decomplexing agent selected from a carboxylic acid, acid anhydride, 1,3-dicarbonyl, or phosphonic acid. For longer shelf life, an organoborane-base complex is preferably not in the same part with an acrylate, methacrylate, acrylamide, methacrylamide, or allyl ester. In some embodiments, the hydroperoxide is in a different part than the organoborane-base complex. For longer shelf-life, the hydroperoxide is preferably in a different part than the organoborane-base complex.

Methods

For multi-part compositions such as those described in the present disclosure to be most easily used in commercial and industrial environments, the ratio at which the various parts are combined should be a convenient whole number. This facilitates application of the composition with conventional, commercially available dispensers. Such dispensers are shown in U.S. Pat. No. 4,538,920 (Drake) and U.S. Pat. No. 5,082,147 (Jacobs) and are available from ConProTec, Inc., Salem, N.H., under the trade designation MIXPAC, and are sometimes described as dual syringe-type applicators.

Typically, for two-part compositions, such dispensers use a pair of tubular receptacles arranged side-by-side with each tube being intended to receive one of the two parts of the composition. Two plungers, one for each tube, are simultaneously advanced (e.g., manually or by a hand-actuated ratcheting mechanism) to evacuate the contents of the tubes into a common, hollow, elongated mixing chamber that may also contain a static mixer to facilitate blending of the two parts. The blended composition is extruded from the mixing chamber, typically onto a substrate. Once the tubes have been emptied, they can be replaced with fresh tubes and the application process continued.

The ratio at which the parts of the composition are combined is controlled by the diameter of the tubes. Each plunger is sized to be received within a tube of fixed diameter, and the plungers are advanced into the tubes at the same speed. A single dispenser is often intended for use with a variety of different compositions and the plungers are sized to deliver the parts of the composition at a convenient mix ratio. For two-part compositions, some common mix ratios are 1:1, 1:2, 1:4, and 1:10 volume:volume.

If the parts of the composition are combined in an odd mix ratio (e.g., 3.5:100), then the ultimate user would probably manually weigh the parts of the composition. Thus, for best commercial and industrial utility and for ease of use with currently available dispensing equipment, the parts, particularly two parts, of the composition should be capable of being combined in a common whole number mix ratio such as, for example, 1:1, 1:2, 1:4, and 1:10.

Once the parts have been combined, the composition should preferably be used within a period of time less than or equal to the work-life of the composition. Once the parts are combined, e.g., part A and part B, the reaction occurs under mild conditions, and preferably under ambient conditions. In this context, "mild conditions" include 0° C. to 50° C., 10° C. to 50° C., 19° C. to 50° C., or 19° C. to 40° C., or 19° C. to 30° C., or 19° C. to 25° C. Ambient conditions include room temperature. If desired, heat could be applied to accelerate the reaction.

Once the parts are combined, e.g., part A and part B, the reaction occurs within hours, and often within minutes. For example, the time for curing the composition can typically range from seconds to 12 hours under ambient conditions. Post-curing at an elevated temperature may also be used if desired. Although relatively quick reaction (polymerization and/or crosslinking) can occur within 12 hours, certain embodiments do not cure that quickly. Such compositions are useful in situations that do not require such rapid cure.

SELECT EMBODIMENTS OF THE PRESENT DISCLOSURE

Embodiment 1

A polymerizable composition comprising:
an organoborane-base complex that is a complex of an organoborane and a base, wherein the base is a complexing agent selected from a compound having one or more amine groups, amidine groups, hydroxide groups, alkoxide groups, or a combination thereof;
a decomplexing agent that at least partially liberates the organoborane from the organoborane-base complex;
a polymerizable thiol-containing component comprising at least one polymerizable thiol-containing compound having a plurality of thiol groups in which the sulfur atom of the thiol group is covalently bonded to carbon;
a hydroperoxide; and
a polymerizable ethylenically-unsaturated component comprising at least one polymerizable ethylenically-unsaturated compound having a plurality of ethylenically-unsaturated groups;
wherein the combined amounts of the thiol-containing and ethylenically-unsaturated compounds total at least 50 percent by weight of all polymerizable material in the polymerizable composition.

Embodiment 2

The polymerizable composition of embodiment 1, wherein the hydroperoxide is an organic hydroperoxide.

Embodiment 3

The polymerizable composition of embodiment 1 or 2, wherein upon reaction a —C—S—C—C— linkage is formed.

Embodiment 4

The polymerizable composition of any one of embodiments 1 to 3, wherein the polymerizable composition is free of any thiol-containing compound having a polymerizable ethylenically-unsaturated group.

Embodiment 5

The polymerizable composition of any one of embodiments 1 to 4, wherein the organoborane-base complex does not include a thiol group.

Embodiment 6

The polymerizable composition of any one of embodiments 1 to 5, wherein the organoborane is represented by the formula $B(R^1)(R^2)(R^3)$ wherein:
$R^1$ represents an alkyl group having from 1 to 10 carbon atoms; and
$R^2$ and $R^3$ independently represent:
alkyl groups having 1 to 10 carbon atoms;
cycloalkyl groups having 3 to 10 carbon atoms;
aryl groups having 6 to 12 carbon atoms; or
aryl groups substituted with alkyl groups having 1 to 10 carbon atoms or cycloalkyl groups having 3 to 10 carbon atoms,
or any two of $R^1$, $R^2$, and $R^3$ taken together form a divalent alkylene group having from 3 to 7 carbon atoms.

Embodiment 7

The polymerizable composition of any one of embodiments 1 to 6, wherein the base is an amine comprising at least one primary or secondary amine group.

Embodiment 8

The polymerizable composition of any one of embodiments 1 to 7, wherein the decomplexing agent comprises at least one of a carboxylic acid, an acid anhydride, an aldehyde, an isocyanate, a phosphonic acid, or a 1,3-dicarbonyl compound.

Embodiment 9

The polymerizable composition of any one of embodiments 1 to 8, wherein the polymerizable composition is a multi-part polymerizable composition.

Embodiment 10

The polymerizable composition of embodiment 9, wherein the multi-part polymerizable composition comprises:
a part A composition comprising the organoborane-base complex; and
a part B composition comprising the decomplexing agent,
wherein the thiol-containing compound is in the part A composition, the part B composition, or another part distinct from the part A composition and the part B composition;
wherein the hydroperoxide is in the part A composition, the part B composition, or another part distinct from the part A composition and the part B composition; and
wherein the polymerizable ethylenically-unsaturated compound is in the part A composition, the part B composition, or another part distinct from the part A composition and the part B composition.

Embodiment 11

The polymerizable composition of any one of embodiments 1 to 10, wherein the thiol-containing component comprises at least one polymerizable thiol-containing compound selected from those prepared from a ring-opening reaction of epoxides with $H_2S$, those prepared by addition of $H_2S$ across carbon-carbon double bonds, polysulfides, polythioethers, polydimethylsiloxanes in which some of the methyl groups have been replaced by mercaptoalkyl groups, and those prepared by esterification of polyols with thiol-containing carboxylic acids or their derivatives.

Embodiment 12

The polymerizable composition of any one of embodiments 1 to 11, wherein the polymerizable ethylenically-unsaturated compound is selected from polyfunctional vinyl ethers, vinyl silicones, vinyl aliphatics, (meth)acrylates, allyl ethers, allyl esters, and allyl amides.

Embodiment 13

The polymerizable composition of any one of embodiments 1 to 12, wherein the amount of the thiol groups in the thiol-containing component and the amount of the polymerizable ethylenically-unsaturated groups in the polymerizable ethylenically-unsaturated component are in a molar ratio range of 0.25:1.0 to 4.0:1.0.

Embodiment 14

The polymerizable composition of any one of embodiments 1 to 13, wherein the molar ratio of hydroperoxy groups to boron atoms is from 0.2 to 1.0.

Embodiment 15

A polymerizable composition comprising:
a part A composition comprising a organoborane-base complex that is a complex of an organoborane and a base, wherein the base is a complexing agent selected from a compound having one or more amine groups, amidine groups, hydroxide groups, alkoxide groups, or a combination thereof; and
a part B composition comprising a decomplexing agent that at least partially liberates the organoborane from the organoborane-base complex;
wherein the polymerizable composition further comprises:
a polymerizable thiol-containing component comprising at least one polymerizable thiol-containing compound having a plurality of thiol groups in which the sulfur atom of the thiol group is covalently bonded to carbon;
a hydroperoxide; and
a polymerizable ethylenically-unsaturated component comprising at least one polymerizable ethylenically-unsaturated compound having a plurality of ethylenically-unsaturated groups,
wherein the combined amounts of the thiol-containing and ethylenically-unsaturated compounds total at least 50 percent by weight of all polymerizable material in the polymerizable composition.

Embodiment 16

The polymerizable composition of embodiment 15, wherein the hydroperoxide is an organic hydroperoxide.

Embodiment 17

The polymerizable composition of embodiment 15 or 16, wherein the hydroperoxide is present in the part B composition.

Embodiment 18

The polymerizable composition of any one of embodiments 15 to 17, wherein upon reaction a —C—S—C—C— linkage is formed.

Embodiment 19

The polymerizable composition of any one of embodiments 15 to 18, wherein the organoborane is represented by the formula $B(R^1)(R^2)(R^3)$ wherein:
$R^1$ represents an alkyl group having from 1 to 10 carbon atoms; and
$R^2$ and $R^3$ independently represent:
alkyl groups having 1 to 10 carbon atoms;
cycloalkyl groups having 3 to 10 carbon atoms;
aryl groups having 6 to 12 carbon atoms; or
aryl groups substituted with alkyl groups having 1 to 10 carbon atoms or cycloalkyl groups having 3 to 10 carbon atoms;
or any two of $R^1$, $R^2$, and $R^3$ taken together form a divalent alkylene group having from 3 to 7 carbon atoms.

Embodiment 20

The polymerizable composition of any one of embodiments 15 to 19, wherein the base is an amine comprising at least one primary or secondary amine group.

Embodiment 21

A composition prepared by combining components comprising:
a part A composition comprising a organoborane-base complex that is a complex of an organoborane and a base, wherein the base is a complexing agent selected from a compound having one or more amine groups, one or more amidine groups, one or more hydroxide groups, one or more alkoxide groups, or a combination thereof; and
a part B composition comprising a decomplexing agent that at least partially liberates the organoborane from the organoborane-base complex,
wherein at least one of the part A composition and the part B composition further comprises:
a polymerizable thiol-containing component comprising at least one polymerizable thiol-containing compound having a plurality of thiol groups in which the sulfur atom of the thiol group is covalently bonded to carbon;
a hydroperoxide; and
a polymerizable ethylenically-unsaturated component comprising at least one polymerizable ethylenically-unsaturated compound having a plurality of ethylenically-unsaturated groups,
wherein the combined amounts of the thiol-containing and ethylenically-unsaturated compounds total at least 50 percent by weight of all polymerizable material in the polymerizable composition.

Embodiment 22

The composition of embodiment 21, wherein the hydroperoxide is an organic hydroperoxide.

Embodiment 23

The composition of embodiment 21 or 22, wherein the organoborane is represented by the formula $B(R^1)(R^2)(R^3)$ wherein:
- $R^1$ represents an alkyl group having from 1 to 10 carbon atoms; and
- $R^2$ and $R^3$ independently represent:
    - alkyl groups having 1 to 10 carbon atoms;
    - cycloalkyl groups having 3 to 10 carbon atoms;
    - aryl groups having 6 to 12 carbon atoms; or
    - aryl groups substituted with alkyl groups having 1 to 10 carbon atoms or cycloalkyl groups having 3 to 10 carbon atoms;
- or any two of $R^1$, $R^2$, and $R^3$ taken together form a divalent alkylene group having from 3 to 7 carbon atoms.

Embodiment 24

The composition of any one of embodiments 21 to 23, wherein the base is an amine comprising at least one primary or secondary amine group.

Embodiment 25

A method of making a composition, the method comprising:
combining components comprising:
a part A composition comprising a organoborane-base complex that is a complex of an organoborane and a base, and wherein the base is a complexing agent selected from a compound having one or more amine groups, amidine groups, hydroxide groups, alkoxide groups, or a combination thereof; and
a part B composition comprising a decomplexing agent that at least partially liberates the organoborane from the organoborane-base complex;
wherein at least one of the part A composition and the part B composition further comprises:
a polymerizable thiol-containing component comprising at least one polymerizable thiol-containing compound having a plurality of thiol groups in which the sulfur atom of the thiol group is covalently bonded to carbon;
a hydroperoxide; and
a polymerizable ethylenically-unsaturated component comprising at least one polymerizable ethylenically-unsaturated compound having a plurality of ethylenically-unsaturated groups,
wherein the combined amounts of the thiol-containing and ethylenically-unsaturated compounds total at least 50 percent by weight of all polymerizable material in the composition; and
allowing the part A composition and the part B composition to react to form a polymer.

Embodiment 26

The method of embodiment 25, wherein the hydroperoxide is an organic hydroperoxide.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Preparation of 4,13-dithia-7,10-dioxa-2,15-dimethylhexadecyl-1,15-diene (DMDO-CMP Diene)

Into a 500-mL four-neck, round bottom flask fitted with a stirrer, thermometer, chilled water condenser and a pressure equalizing addition funnel was added 206.54 grams of a 20% aqueous solution of sodium hydroxide (1.033 moles). To this was added, dropwise with stirring, 94.08 grams of 1,8-dimercapto-3,6-dioxaoctane (DMDO, 0.51 moles, obtained from Arkema, Inc., King of Prussia, Pa.), and the mixture then allowed to cool to approximately 21° C. 3-chloro-2-methyl-1-propene (CMP, 96.4 grams, 1.065 moles) was added drop wise with vigorous stirring, and stirring continued for another 2 hours. The mixture was then held at 21° C. for approximately 16 hours, after which 150 grams of a clear layer was decanted. NMR analysis confirmed the decanted layer to be DMDO-CMP diene, the structure of which is shown below.

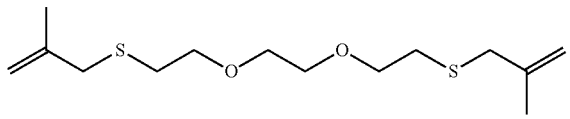 [SMILES: C=C(C)CSCCOCCOCCSCC(=C)C]

Preparation of Polythioether CMPDP

Into a 100-mL round bottom flask equipped with an air-driven stirrer, thermometer, and a dropping funnel, was added 36.68 grams (0.20 moles) DMDO and 4.17 grams (0.0127 moles) of a diglycidyl ether of bisphenol F (obtained as EPALLOY 8220 from Emerald Performance Materials, LLC, Cuyahoga Falls, Ohio). To this mixture was added 0.02 grams of triethylenediamine, obtained as DABCO from Air Products & Chemicals, Inc., Allentown, Pa. The system was flushed with nitrogen, then mixed and heated for 1.5 hours at 60-70° C. 23.92 grams (0.082 moles) DMDO-CMP Diene was added, followed by approximately 0.01 grams VAZO 52. With continuous stirring, an additional 0.13 gram of 2,2'-azobis(2,4-dimethyl-pentanenitrile) (obtained as VAZO 52 from E.I. du DuPont de Nemours and Company) was added, the mixture maintained at 60° C. for another 4.5 hrs. 1,2,4-Trivinylcyclohexane (0.81 grams, 0.005 moles, obtained from BASF Corp., Florham Park, N.J.) was then added, along with an additional 0.02 gram of VAZO 52, and maintained at 60° C. for another 1.5 hrs. Triethylene glycol divinyl ether (14.44 grams, 0.07 moles, obtained as RAPI-CURE DVE-3 from Ashland Specialty Ingredients, Wilmington, Del.) was then added dropwise to the flask over 15 minutes, keeping the temperature at approximately 70° C. Additional VAZO 52 was added in approximately 0.01 gram increments over approximately 16 hours for a total of about 0.4 grams. The temperature was raised to 100° C. and the material degassed for approximately 10 minutes. The resultant polythioether had a molecular weight of approximately 3200 grams/mole with 2.2 theoretical thiol functionality.

Additional materials used in the Examples are listed in Table 1 (below).

TABLE 1

| CHEMICAL NAME OR ABBREVIATION | DESCRIPTION AND SUPPLIER |
|---|---|
| APE | Allyl pentaerythritol (i.e., pentaerythritol tetra-allyl ether), available from Perstorp Specialty Chemicals AB (Skane, Sweden) |
| 2,5-bis(t-butylperoxy)-2,5-dimethylhexane | 2,5-bis(tert-butylperoxy)-2,5-dimethylhexane, LUPEROX 101 available from Arkema Inc. (King of Prussia, PA USA) |
| t-butyl hydroperoxide | tert-butyl hydroperoxide, 5.0-6.0M in nonane available from Sigma-Aldrich (Milwaukee, WI USA) |
| t-butyl peroxy-3,5,5-trimethylhexanoate | tert-butyl peroxy-3,5,5-trimethylhexanoate, available from ACROS Organics (Antwerp, Belgium) |
| Cumene hydroperoxide | Cumene hydroperoxide from Lucidol Division, Pennwalt Corp (Buffalo, NY USA); now part of Arkema, Inc. |
| DEGDVE | Di(ethylene glycol) divinyl ether available from Sigma-Aldrich |
| 2,5-di(t-butylperoxy)-2,5-dimethyl-3-hexyne | 2,5-di(tert-butylperoxy)-2,5-dimethyl-3-hexyne available from Sigma-Aldrich |
| Dicumyl peroxide | Dicumyl peroxide available from Sigma-Aldrich |
| DDSA | Dodecenylsuccinic anhydride available from Sigma-Aldrich |
| GPM-800 | Multi-functional thiol, having on average roughly 3 thiol groups per molecule, thiol equivalent weight of approximately 277, available from Gabriel Performance Products (Ashtabula, OH). Equivalent material to CAPCURE 3-800 from BASF (Florham Park, NJ, USA). |
| LP-3 | Multi-functional thiol polysulfide, THIOKOL LP-3, available from Toray Fine Chemicals Co., Ltd. (Chiba, Japan) |
| MOPA | 3-methoxypropylamine available from Sigma-Aldrich |
| Nonanoic acid | Nonanoic acid available from Sigma-Aldrich |
| TEGDVE | Tri(ethylene glycol) divinyl ether available from Sigma-Aldrich |
| TnBB-MOPA | Tri-n-butylborane-3-methoxypropylamine complex (with between 6 to 9 wt. percent free 3-methoxypropylamine per BASF; NMR indicated approximately 12 wt. percent free 3-methoxypropylamine), available from BASF (Florham Park, NJ, USA) |

Peroxides used in the Examples are listed in Table 2 (below).

TABLE 2

| EXAMPLE or COMPARATIVE EXAMPLE | PEROXIDE USED |
|---|---|
| 1, 3, 5, CEF, CEG | cumene hydroperoxide |
| 2, 4 | t-butyl hydroperoxide |
| CEA, CEH | t-butyl peroxy-3,5,5-trimethylhexanoate |
| CEB, CEI | dicumyl peroxide |
| CEC, CEJ, CEM | 2,5-di(t-butylperoxy)-2,5-dimethyl-3-hexyne |
| CED, CEK | 2,5-bis(t-butylperoxy)-2,5-dimethylhexane (LUPEROX 101) |
| CEE, CEL | none |

Examples 1-2 and Comparative Examples CEA-CEE

Examples 1-2 and Comparative Examples CEA-CEE involved the same 2-part thiol-ene composition, except for the presence or absence of a peroxide, and the identity of the peroxide. Part A included diethylene glycol divinyl ether (DEGDVE), triethylene glycol divinyl ether (TEGDVE), and tri-n-butylborane:3-methoxypropylamine complex (TnBB-MOPA). Part B included CMPDP, GPM-800, dodecenyl anhydride (DDSA), and optionally a peroxide. If present, the amount of peroxide added corresponded to approximately 0.75 moles of the —O—O— group per mole TnBB-MOPA.

The components of Part A were weighed into a glass vial and mixed to provide a liquid mixture. The components of Part B were weighed into a max 10, DAC plastic mixing cup at room temperature. The dimensions of the inner, cylindrical cavity of the max 10 mixing cup were approximately 26 mm in diameter by 27 mm in height. The cup was capped and contents mixed at 2000 rpm for 1 minute with a centrifugal mixer (SpeedMixer, model DAC 150.1 FVZ-K from FlackTek Inc., Landrum, S.C.), which provided a viscous, flowable liquid. The weights of the components in Part B are reported in Table 3. In the case of Example 2, the weight of peroxide reported is the approximate weight of the t-butyl peroxide excluding the nonane solvent. This peroxide was added to the formulation as a solution in nonane (i.e., it was used as received from Sigma-Aldrich). Then, Part A was weighed into the max 10 mixing cup that contained Part B (at room temperature). The amount of Part A transferred to the mixing cup was such that it provided the amounts of the individual components as reported in Table 3. The actual amounts weighed initially into the glass vial for Part A were in excess of the amounts delivered to Part B by approximately 10 percent. After addition of Part A to Part B, the composition was immediately mixed at 2000 rpm for 1 minute with the SpeedMixer DAC 150.1 FVZ-K, and then the contents observed. The contents of the cups had leveled and filled the bottom of the cups to a depth of approximately 1.0 cm.

TABLE 3

| EXAMPLE | PART A, grams | | | PART B, grams | | | |
|---|---|---|---|---|---|---|---|
| | DEGDVE | TEGDVE | TnBB-MOPA | CMPDP | GPM-800 | DDSA | Peroxide |
| 1 | 0.129 | 0.173 | 0.197 | 4.267 | 0.289 | 0.468 | 0.088 |
| 2 | 0.130 | 0.177 | 0.196 | 4.284 | 0.281 | 0.448 | 0.050 |
| CEA | 0.128 | 0.176 | 0.198 | 4.273 | 0.302 | 0.464 | 0.123 |
| CEB | 0.130 | 0.175 | 0.201 | 4.284 | 0.279 | 0.450 | 0.148 |
| CEC | 0.133 | 0.177 | 0.200 | 4.268 | 0.275 | 0.450 | 0.079 |
| CED | 0.131 | 0.175 | 0.198 | 4.271 | 0.278 | 0.464 | 0.077 |
| CEE | 0.134 | 0.178 | 0.195 | 4.288 | 0.270 | 0.479 | 0.000 |

In the case of Examples 1 and 2, the contents of the cups cured to a uniform, solid material within 5 minutes after the mixing together of Parts A and B. Comparative Examples A-E did not cure to a uniform, solid material within 5 minutes. Comparative Example B was a viscous liquid, and Comparative Examples A, C, D, and E formed a skin (i.e., a thin elastomeric solid film or layer) on the top surface of the composition with viscous liquid below. After 19 hours, Comparative Examples A-E still had not cured to a uniform, solid material. All had a skin layer on the top surface, which may have increased in thickness relative to the 5 minute mark, but the bulk of the composition was a viscous liquid-like material.

Comparative Example F (CEF)

Comparative Example F was similar to Example 1, except that no organoborane-amine complex (TnBB-MOPA) was initially present in the composition, and no compounds with at least two ethylenically-unsaturated groups (DEGDVE, TEGDVE) were present. This was done to demonstrate that the rapid and uniform cures seen in Example 1 (and Example 2) were not the result of oxidative coupling of thiols to form disulfide linkages, but rather required the multi-functional ethylenically-unsaturated compounds and curing via thiol-ene reaction.

CMPDP, GPM-800, dodecenyl anhydride (DDSA), and cumene hydroperoxide were weighed into a max 10, DAC plastic mixing cup (at room temperature), and mixed at 2000 rpm for 1 minute with a centrifugal mixer (SpeedMixer, model DAC 150.1 FVZ-K), and then the contents observed. Initially, the contents was a viscous liquid, and it remained a viscous liquid for approximately 2 hours, at which time TnBB-MOPA was weighed into the cup and mixed at 2000 rpm for 1 minute with the centrifugal mixer. The contents were checked periodically up to 12 days after the addition of the TnBB-MOPA, and the contents remained a viscous liquid and no skin layer formed on the top surface. The weights of the components are reported in Table 4.

TABLE 4

| EXAMPLE | CMPDP, grams | GPM-800, grams | DDSA, grams | Cumene Hydro-peroxide, grams | TnBB-MOPA, grams |
|---|---|---|---|---|---|
| CEF | 4.271 | 0.274 | 0.457 | 0.083 | 0.192 |

Comparative Example G (CEG)

Comparative Example G was similar to Example 1, and the same procedure was followed to prepare the example, except no organoborane-amine complex (TnBB-MOPA) was present in the composition and 3-methoxypropylamine (MOPA) was added to Part A. This was done to demonstrate that the rapid and uniform cures seen in Example 1 (and Example 2) were not the result of initiation by radical species that might potentially be generated from unanticipated redox reaction between free amine, i.e., 3-methoxypropylamine, and cumene hydroperoxide. After combining Part A, which was a liquid, and Part B, and mixing in a max 10, DAC plastic mixing cup, the contents was observed. Initially, the contents was a viscous liquid. The contents was checked periodically up to 2 days, and the contents remained a viscous liquid, and no skin layer formed on the top surface. The weights of the components are reported in Table 5.

TABLE 5

| EXAMPLE | PART A, grams | | | PART B, grams | | | |
|---|---|---|---|---|---|---|---|
| | DEGDVE | TEGDVE | MOPA | CMPDP | GPM-800 | DDSA | Cumene Hydroperoxide |
| CEG | 0.133 | 0.183 | 0.052 | 4.269 | 0.275 | 0.461 | 0.087 |

Examples 3-4 and Comparative Examples CEH-CEL

Examples 3-4 and Comparative Examples CEH-CEL involved the same 2-part thiol-ene composition, except for the presence or absence of a peroxide, and the identity of the peroxide. Part A included diethylene glycol divinyl ether (DEGDVE), and tri-n-butylborane:3-methoxypropylamine complex (TnBB-MOPA). Part B included LP-3, GPM-800, dodecenyl anhydride (DDSA), and optionally a peroxide. If present, the amount of peroxide added corresponded to approximately 0.75 moles of the —O—O— group per mole TnBB-MOPA.

The components of Part A were weighed into a glass vial and mixed to provide a liquid mixture. The components of Part B were weighed into a max 10, DAC plastic mixing cup (at room temperature), and mixed at 2000 rpm for 1 minute with a centrifugal mixer (SpeedMixer, model DAC 150.1 FVZ-K from FlackTek Inc., Landrum, S.C. USA), which provided a viscous, flowable liquid. The weights of the components in Part B are reported in Table 5. In the case of Example 10, the weight of peroxide reported is the approximate weight of the t-butyl peroxide excluding the nonane solvent. This peroxide was added to the formulation as a solution in nonane (i.e., it was used as received from Sigma-Aldrich). Then Part A was weighed into the max 10 mixing cup that contained Part B (at room temperature). The amount of Part A transferred to the mixing cup was such that it provided the amounts of the individual components as reported in Table 6. The actual amounts weighed initially into the glass vial for Part A were in excess of the amounts delivered to Part B by approximately 10 percent. After addition of Part A to Part B, the composition was immediately mixed at 2000 rpm for 1 minute with the SpeedMixer DAC 150.1 FVZ-K, and then the contents observed. The contents of the cups had leveled and filled the bottom of the cups to a depth of approximately 1.0 cm.

TABLE 6

| EXAMPLE | PART A, grams | | PART B, grams | | | |
|---|---|---|---|---|---|---|
| | DEGDVE | TnBB-MOPA | LP-3 | GPM-800 | DDSA | Peroxide |
| 3 | 0.745 | 0.200 | 3.657 | 0.521 | 0.383 | 0.083 |
| 4 | 0.740 | 0.199 | 3.654 | 0.522 | 0.384 | 0.050 |
| CEH | 0.748 | 0.198 | 3.655 | 0.535 | 0.389 | 0.122 |
| CEI | 0.752 | 0.199 | 3.655 | 0.522 | 0.391 | 0.148 |
| CEJ | 0.747 | 0.198 | 3.653 | 0.535 | 0.384 | 0.071 |
| CEK | 0.741 | 0.196 | 3.651 | 0.521 | 0.384 | 0.076 |
| CEL | 0.742 | 0.199 | 3.652 | 0.520 | 0.384 | 0.000 |

In the case of Examples 3 and 4, the contents of the cups cured to a uniform, solid material within 2 minutes after the mixing together of Parts A and B. Comparative Examples CEH-CEL all remained viscous liquids and did not cure to a uniform, solid material within 2 minutes. After 55 minutes, Comparative Examples CEH-CEL all had formed a skin (i.e., a thin elastomeric solid film or layer) on the top surface of the composition with viscous liquid below. After 2 days, Comparative Examples CEH-CEL still had not cured to a uniform, solid material. All had a skin layer on the top surface, which may have increased in thickness relative to the 55 minute mark, but the bulk of the composition was a viscous liquid.

Example 5 and Comparative Example m

Example 5 and Comparative Example M involved the same 2-part thiol-ene composition, except that the peroxide was cumene hydroperoxide in Example 5 and 2,5-di(t-butylperoxy)-2,5-dimethyl-3-hexyne in Comparative Example M. Part A included allyl pentaerythritol (APE), and tri-n-butylborane:3-methoxypropylamine complex (TnBB-MOPA). Part B included GPM-800, nonanoic acid, and the peroxide. The amount of peroxide added corresponded to approximately 0.745 moles of the —O—O— group per mole TnBB-MOPA.

The components of Part A were weighed into a glass vial and mixed to provide a liquid mixture. The components of Part B were weighed into a max 10, DAC plastic mixing cup (at room temperature), and mixed at 2000 rpm for 1 minute with a centrifugal mixer (SpeedMixer, model DAC 150.1 FVZ-K), which provided a liquid. The weights of the components in Part B are reported in Table 6. Then Part A was weighed into the max 10 mixing cup that contained Part B (at room temperature). The amount of Part A transferred to the mixing cup was such that it provided the amounts of the individual components as reported in Table 7. The actual amounts weighed initially into the glass vial for Part A were in excess of the amounts delivered to Part B by approximately 10 percent. After addition of Part A to Part B, the composition was immediately mixed at 2000 rpm for 1 minute with the SpeedMixer DAC 150.1 FVZ-K, and then the contents observed. The contents of the cups had leveled and filled the bottom of the cups to a depth of approximately 1.0 cm.

TABLE 7

| EXAMPLE | PART A, grams | | PART B, grams | | |
|---|---|---|---|---|---|
| | APE | TnBB-MOPA | GPM-800 | Nonanoic Acid | Peroxide |
| 5 | 1.132 | 0.088 | 4.221 | 0.066 | 0.037 |
| CEM | 1.130 | 0.088 | 4.221 | 0.066 | 0.027 |

In the case of Example 5, 4 minutes after the mixing together of Parts A and B, a skin layer formed on top surface of the composition with viscous liquid underneath, and then in an additional minute the entire contents of the cup gelled. After 4 hours, the contents had firmed to a rubbery material throughout. In Comparative Example CEM, a skin layer formed after 12-22 minutes with a flowable liquid underneath. After 2 days, the skin layer had thickened to roughly 1 mm in thickness, and a flowable, viscous liquid was underneath.

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A polymerizable composition comprising:
   an organoborane-base complex that is a complex of an organoborane and a base,
   wherein the organoborane is represented by the formula $B(R^1)(R^2)(R^3)$ wherein:
   $R^1$ represents an alkyl group having from 1 to 10 carbon atoms; and $R^2$ and $R^3$ independently represent: alkyl groups having 1 to 10 carbon atoms; cycloalkyl groups having 3 to 10 carbon atoms; aryl groups having 6 to 12 carbon atoms; or aryl groups substituted with alkyl groups having 1 to 10 carbon atoms or cycloalkyl groups having 3 to 10 carbon atoms, or any two of $R^1$, $R^2$, and $R^3$ taken together form a divalent alkylene group having from 3 to 7 carbon atoms, and
   wherein the base is a complexing agent selected from a compound having one or more functional groups selected from the group consisting of amine groups, amidine groups, hydroxide groups, alkoxide groups, and combinations thereof;
   a decomplexing agent that at least partially liberates the organoborane from the organoborane-base complex;
   a polymerizable thiol-containing component comprising at least one polymerizable thiol-containing compound having a plurality of thiol groups in which the sulfur atom of the thiol group is covalently bonded to carbon;
   a hydroperoxide; and
   a polymerizable ethylenically-unsaturated component comprising at least one polymerizable ethylenically-unsaturated compound having a plurality of ethylenically-unsaturated groups;
   wherein the combined amounts of the thiol-containing and ethylenically-unsaturated compounds total at least 50 percent by weight of all polymerizable material in the polymerizable composition.

2. The polymerizable composition of claim 1, wherein the hydroperoxide is an organic hydroperoxide.

3. The polymerizable composition of claim 1, wherein upon reaction a —C—S—C—C— linkage is formed.

4. The polymerizable composition of claim 1, wherein the polymerizable composition is free of any thiol-containing compound having a polymerizable ethylenically-unsaturated group.

5. The polymerizable composition of claim 1, wherein the organoborane-base complex does not include a thiol group.

6. The polymerizable composition of claim 1, wherein the base is an amine comprising at least one primary or secondary amine group.

7. The polymerizable composition of claim 1, wherein the decomplexing agent comprises at least one of a carboxylic acid, an acid anhydride, an aldehyde, an isocyanate, a phosphonic acid, or a 1,3-dicarbonyl compound.

8. The polymerizable composition of claim 1, wherein the polymerizable composition is a multi-part polymerizable composition.

9. The polymerizable composition of claim 8, wherein the multi-part polymerizable composition comprises:
   a part A composition comprising the organoborane-base complex; and
   a part B composition comprising the decomplexing agent,
   wherein the thiol-containing compound is in the part A composition, the part B composition, or another part distinct from the part A composition and the part B composition;
   wherein the hydroperoxide is in the part A composition, the part B composition, or another part distinct from the part A composition and the part B composition, and
   wherein the polymerizable ethylenically-unsaturated compound is in the part A composition, the part B composition, or another part distinct from the part A composition and the part B composition.

10. The polymerizable composition of claim 1, wherein the thiol-containing component comprises at least one polymerizable thiol-containing compound selected from those prepared from a ring-opening reaction of epoxides with $H_2S$, those prepared by addition of $H_2S$ across carbon-carbon double bonds, polysulfides, polythioethers, polydimethylsiloxanes in which some of the methyl groups have been replaced by mercaptoalkyl groups, and those prepared by esterification of polyols with thiol-containing carboxylic acids or their derivatives.

11. The polymerizable composition of claim 1, wherein the polymerizable ethylenically-unsaturated compound is selected from polyfunctional vinyl ethers, vinyl silicones, vinyl aliphatics, (meth)acrylates, allyl ethers, allyl esters, and allyl amides.

12. The polymerizable composition of claim 1, wherein the amount of the thiol groups in the thiol-containing component and the amount of the polymerizable ethylenically-unsaturated groups in the polymerizable ethylenically-unsaturated component are in a molar ratio range of 0.25:1.0 to 4.0:1.0.

13. The polymerizable composition of claim 1, wherein the molar ratio of hydroperoxy groups to boron atoms is from 0.2 to 1.0.

* * * * *

UNITED STATES PATENT AND TRADEMARK OFFICE
CERTIFICATE OF CORRECTION

Page 1 of 1

PATENT NO. : 10,889,687 B2
APPLICATION NO. : 15/756283
DATED : January 12, 2021
INVENTOR(S) : Robert Clough It is certified that error appears in the above-identified patent and that said Letters Patent is hereby corrected as shown below:

In the Specification

Column 11
Line 61, Delete "m+(e.g.," and insert -- m+ (e.g., --, therefor.

Column 21
Line 50, Delete "(tris[2-β-mercaptopropionyloxy)ethyl])," and insert
-- (tris[2-(3-mercaptopropionyloxy)ethyl]), --, therefor.

Column 38
Line 19, Delete "Example m" and insert -- Example M --, therefor.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*